TELEPHONE PULSE METERING SYSTEM

Filed Sept. 17, 1965

INVENTORS
EMIEL H.M. SELLENSLAGH
W. VAN HOECK
BY [signature]
ATTY.

March 18, 1969 E. H. M. SELLENSLAGH ET AL 3,433,898

TELEPHONE PULSE METERING SYSTEM

Filed Sept. 17, 1965

United States Patent Office 3,433,898
Patented Mar. 18, 1969

3,433,898
TELEPHONE PULSE METERING SYSTEM

Emiel H. M. Sellenslagh, Aartselaar, and Willy F. Van Hoeck, Boom, Belgium, assignors to Automatic Electric Laboratories, Inc., Northlake, Ill., a corporation of Delaware Filed Sept. 17, 1965, Ser. No. 488,043
U.S. Cl. 179—7 9 Claims
Int. Cl. H04m *15/10*

ABSTRACT OF THE DISCLOSURE

A time and zone metering system wherein a central store is used to accumulate the metering pulse total for each line. The central store consists of a magnetic drum with which a line scanner is synchronized. Each line is equipped with a relay that is operated by a metering pulse to close a pair of make contacts wired into a gating arrangement with the timing pulses, so that the combination of the allotted time by the scanner and the closed contacts are effective to place a mark on the section of the drum associated with this particular line. This mark is then re-read by the metering equipment, which reads the total count in another section of the drum for this particular line and upgrades its count to include this presently placed metering pulse.

The present invention relates to telephone or like systems and is more particularly concerned with public telephone systems of the type in which the number of calls completed by a subscriber or the number of unit values represented by such calls is recorded on some type of register device, the information from which is then used as the basis for rendering accounts.

The arrangement almost universally adopted at the present time is to make use of an electromagnetically-operated step-by-step ring counter with four or five decimal positions. Such a counter, which is on a per subscriber basis, makes one or several steps at the beginning of the conversation depending on the distance between the calling and the called parties. For long distance calls, the counter will step during the conversation with a certain frequency depending on the distance between the two parties. This system is known as periodic pulse metering.

Readings of the various counters are made at predetermined intervals, for instance monthly or quarterly, and the accounts to the subscribers are made out from the figures thus obtained. The individual reading of the meters and the preparation of the accounts is a tedious operation, even if some degree of mechanization is used with as by photographing them. The picture that is taken of the panel mounted counters is then read and the reading is perforated on cards by an operator; the final bill for the customer is a copy of this card. This major disadvantage of the mechanical counters, caused by the difficulty of reproducing their position for billing the customer except by the slow and very expensive manual operation, has resulted in the expenditure of much effort to improve the system.

Accordingly, the chief object of the present invention is to improve the arrangements for registering the number of calls made by a subscriber and to reduce the amount of equipment required and in addition to simplify and expedite the subsequent processing of the information registered.

According to one feature of the invention, in an arrangement for registering total fees for telephone calls in response to the receipt of meter pulses, a continuously-operated high-speed register device is provided in common to a plurality of subscribers' lines which are arranged to be scanned at regular intervals in synchronism with the operation of the register device and when an indication corresponding to a meter pulse is found, a registration is made in the appropriate storage area of the register device.

According to another feature of the invention in an arrangement for registering total fees for telephone calls in response to the receipt of meter pulses, use is made of a magnetic drum storage device common to a plurality of subscribers' lines which are arranged to be scanned at regular intervals in synchronism with the operation of the drum for the presence of meter pulses which are then registered in the appropriate storage areas assigned to the different subscribers.

In a preferred form of the invention a magnetic drum is employed which is provided with a plurality of circumferential tracks each having associated therewith a so-called writing head for effecting the registration of suitable information and also a so-called reading head by means of which the information may be extracted when required. Conveniently the information is stored in a binary code and arrangements may be made for reading it successively in respect of all subscribers in response to a suitable initiating operation which will be performed at predetermined intervals in accordance with the present practices.

It will be understood that the expression "magnetic drum" is intended to cover also a disc and an endless tape through the cylindrical form offers such advantages that it would generally be preferred in practice.

The records of such a registering device have a surprising degree of permanence if no specific action is taken to erase them and therefore there would be no danger of loss of existing storage if there should be a power failure or some other temporary breakdown of the equipment.

The following discloses a method of performing the metering per subscriber for local and interoffice calls on an electronic basis, and may be added to existing offices of any nature.

The system is based on the following points:

(1) For local calls the subscriber's line circuit receives a metering impulse to be stored on a certain device, which in most cases is a mechanical counter.

(2) For interoffice calls the subscriber line circuit receives a metering impulse at the start of the conversation, followed by impulses of a certain repetition rate depending on the distance between the two subscribers in conversation.

(3) The metering impulses have a length of 30 to 50 msec. with a minimum time between the pulses of 2 to 9 seconds.

(4) A 50 volt source is used for the metering pulses to operate the mechanical counters.

In this system developed for addition to existing offices with mechanical counters, a small reed relay is put in parallel with the counter or replaces the counter. This relay serves to identify the line circuit. Every time it is energized a flag is sent to an electronic scanner, the position of which corresponds with the line number of this relay. The total number of impulses per subscriber is stored on a magnetic drum.

*The magnetic drum*

The magnetic drum is a memory with a very large capacity. In this system, the magnetic drum is operated in parallel, this means that the information is read (or written) at the same time on all tracks. To localize the position of the parallel lines on the drum we need a clocktrack and a reference point for synchronization on the drum. The clocktrack consists of a continuous series of "1's" recorded around the drum. These "1" bits, which correspond with the information bits on other tracks, are used to drive an electronic counter which is started at the reference point. The counter is used for identification of a memory element of a given address on a given track and more precisely it identifies the element on the same parallel line (slot) as the "1" bit which has given the clocktrack address counter the position that corresponds with the address of this element. The reference position which is necessary to determine the start position on the magnetic drum is written on an equivalent track and consists of a "1" bit in one cell of the track and in all other cells a "0."

Every subscriber connected to the system is associated with one of the parallel lines of the magnetic drum, and therefore the position of the drum counter indicates at any given moment for which subscriber a certain operation may be performed.

Every position of the drum counter corresponds with a parallel line on the drum.

*Counting system*

On every line of the magnetic drum, we find besides the address of the subscriber, a section for the registration of the counter position.

The identification of the metering relays is synchronized with the position of the drum. Every binary position of the drum counter is decoded in decimal and fed to the reed contact of the metering relay in the line circuit of the subscriber with the corresponding identity.

The identification circuit detects the state of the relays. At every revolution of the magnetic drum the memorized state of the metering relay is compared with the actual state. In the case of a closure, an indication is written on the drum to increase by one unit the counter position for this address.

There are three tracks used for this operation. These three tracks are used as a temporary storage for the state of the metering relay of every subscriber and give the commands for an addition to the counters of the different subscribers to the common logic circuits.

*Track I.*—LIC (Line Condition) follows the state of the metering relay. When it closes a "1" is written, when it opens a "0" is written. To prevent the detection of the vibrations of the contacts of the metering relay as additional impulses, the access time to the relay is very short (1 $\mu$sec.) and the time between two readings on the relay is very long (20 to 40 msec.).

*Track II.*—MT1 (Metering)—On this track a "1" is written when the metering relay is closed and there is a "0" written on the track V. This information gives the command to the counting circuits to increase the corresponding counter with one unit. A zero is written on this track when the adding on the counter of the corresponding parallel line is performed.

*Track III.*—V (Metering Control)—A "one" is written when $MT1=1$ and the corresponding meeting relay is closed. This prevents reading of the same metering impulse of a metering relay at different revolutions of the magnetic drum. The third track acts as a buffer register for separation of the mechanical relay from the electronic counter.

*Semi-permanent memory*

When a one is read from the second track MT1 on a given parallel line, the sections LC1 through LC4 from the same line on the magnetic drum are read through the buffer register into the write command circuit.

The indication $MT1=1$ will add one unit to the binary value in the write commands. When, at the next revolution the write command circuit is located before this given parallel line of the magnetic drum, the information of this circuit is written in positions LC1 to LC4 without destroying the information in the write command storage.

At the next revoluton, the information in LC1 through LC4 from the given line is read-out and put into the buffer register.

The information of the write command storage is now compared with the information of the buffer register. In the case of parity between these two informations, the semi-permanent memory section becomes free for the next operating cycle.

In case there is no parity between the two informations, they are both sent along with the address of the line (this may be read from the drum counter) to a buffer circuit from which all the information is printed out. The printed information will indicate the error and one may easily deduce the necessary actions to correct the error.

*Access and output circuits*

A console panel with keys allows the reading or writing of every single bit on the magnetic drum.

The read-out of the meter position of a particular subscriber may be done in different manners:

(1) The meter position of the subscriber may be read on indicator tubes by keying in through the console panel the address of the subscriber along with a code.

(2) The read-out on perforated tape and/or on a typewriter of a particular counter may be done by sending into the system through the keys of the console panel, the corresponding subscriber address along with a code.

(3) After a certain period, it is necessary to read-out all the counters to make the subscriber's bill. With a 4 or 5 decimal counter this period may be estimated at 1 or 2 months. A special code is sent by the console panel to the semi-permanent memory section indicating that a read out of the sections LC1 through LC4 on the magnetic drum for all the parallel lines is to be performed.

This operation starts at the reference point of the magnetic drum and is done in the decimal order of the subscriber numbers. The informations are stored on a perforated tape or are typewritten. After the read-out of the sections LC1 through LC4 of a particular line, the decimal zero position is written in.

The invention will be better understood from the following description of a preferred form of carrying it into effect, which should be taken in conjunction with the accompanying drawings comprising FIGURES 1 to 16. Of these, FIGURE 1 is a block schematic showing the general arrangement of the equipment used in one form of carrying out the invention;

LOGIC SYMBOLISM

Figure 3:
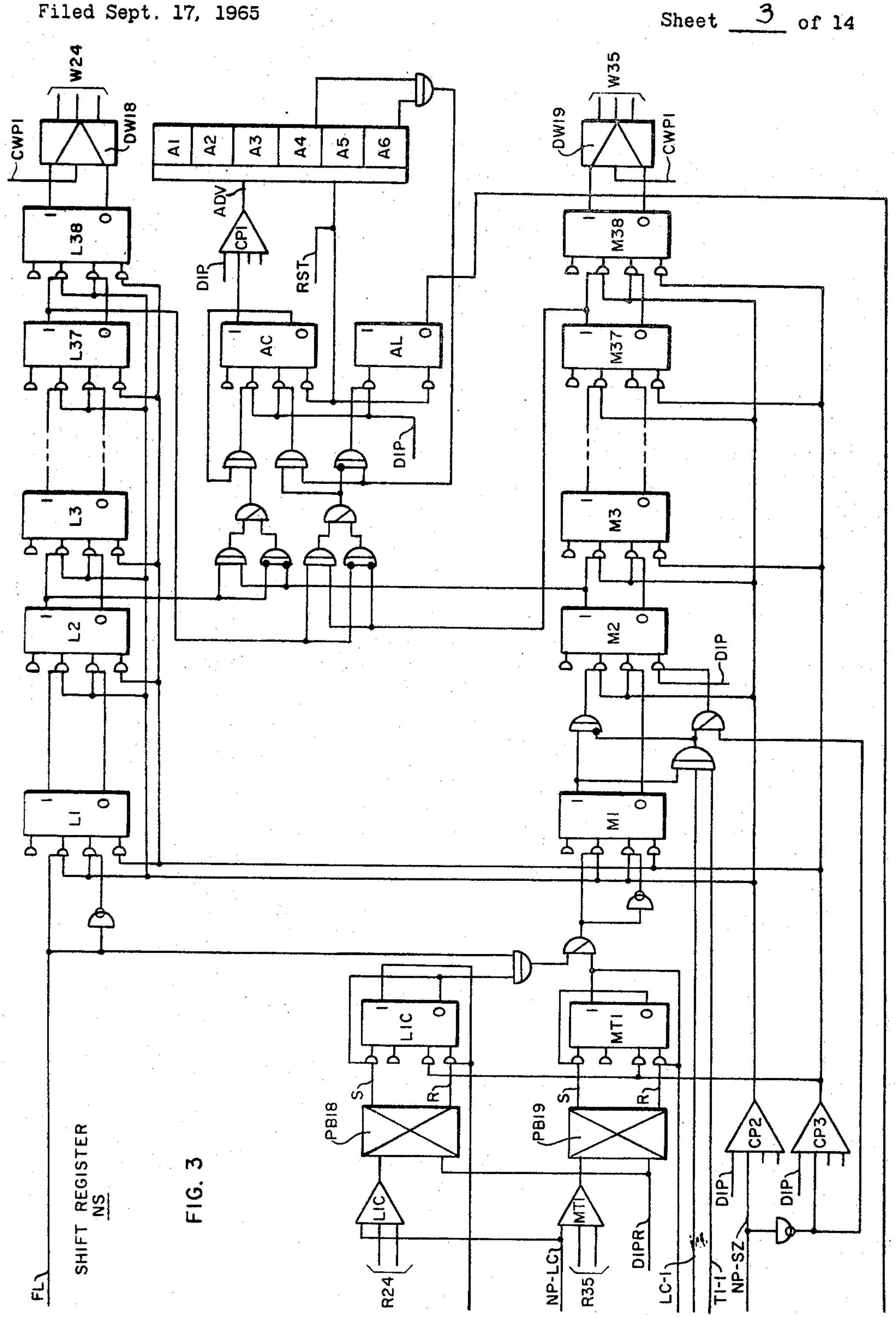
FIGURE 3 shows the shift register that controls the writing in of a metering mark upon the drum.
Figure 4:
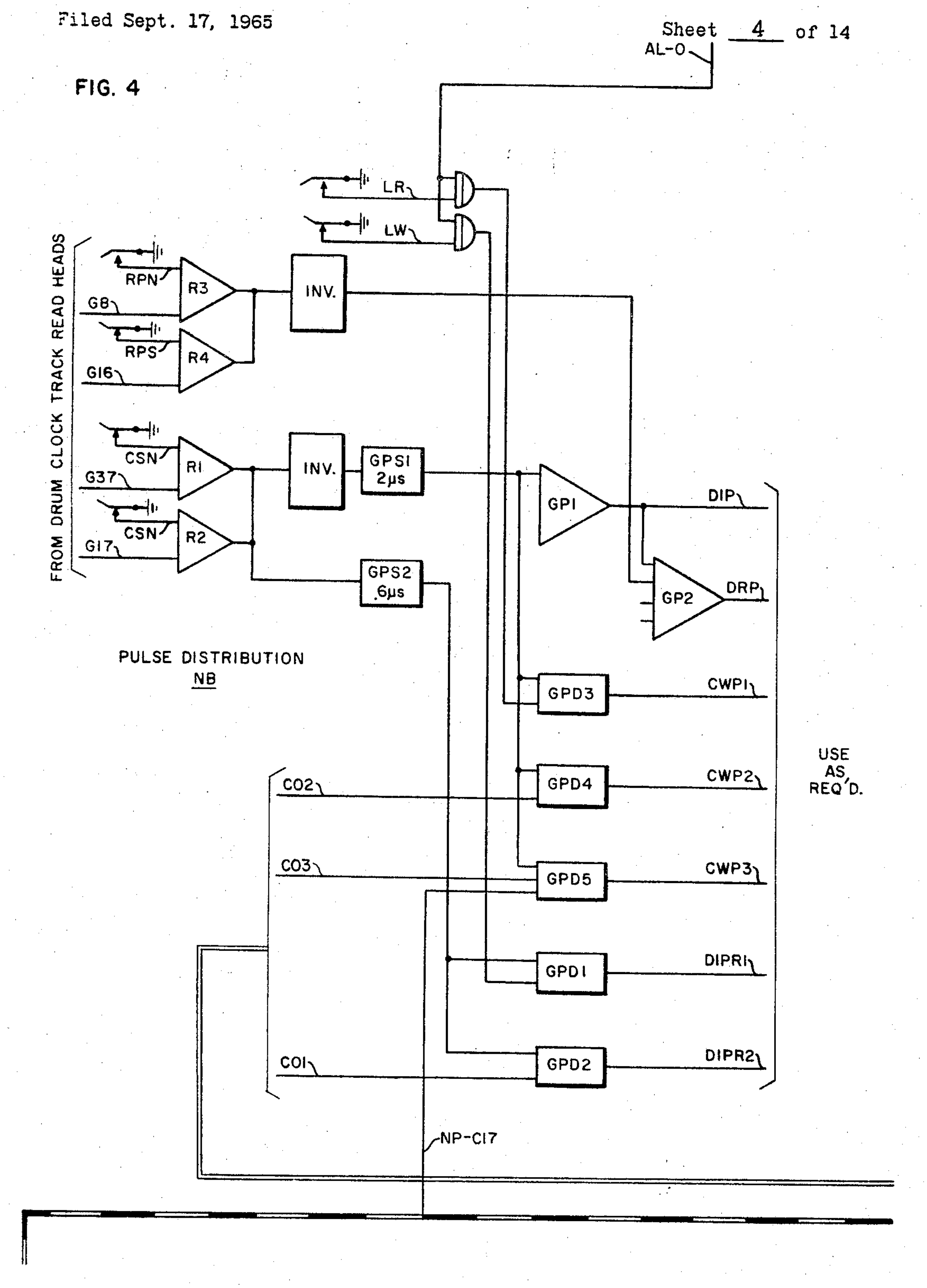
FIGURE 4 shows the pulse distribution circuit that reads the timing pulses from the drum surface, then amplifies and shapes them for distribution to the associated circuits.
Figure 5:
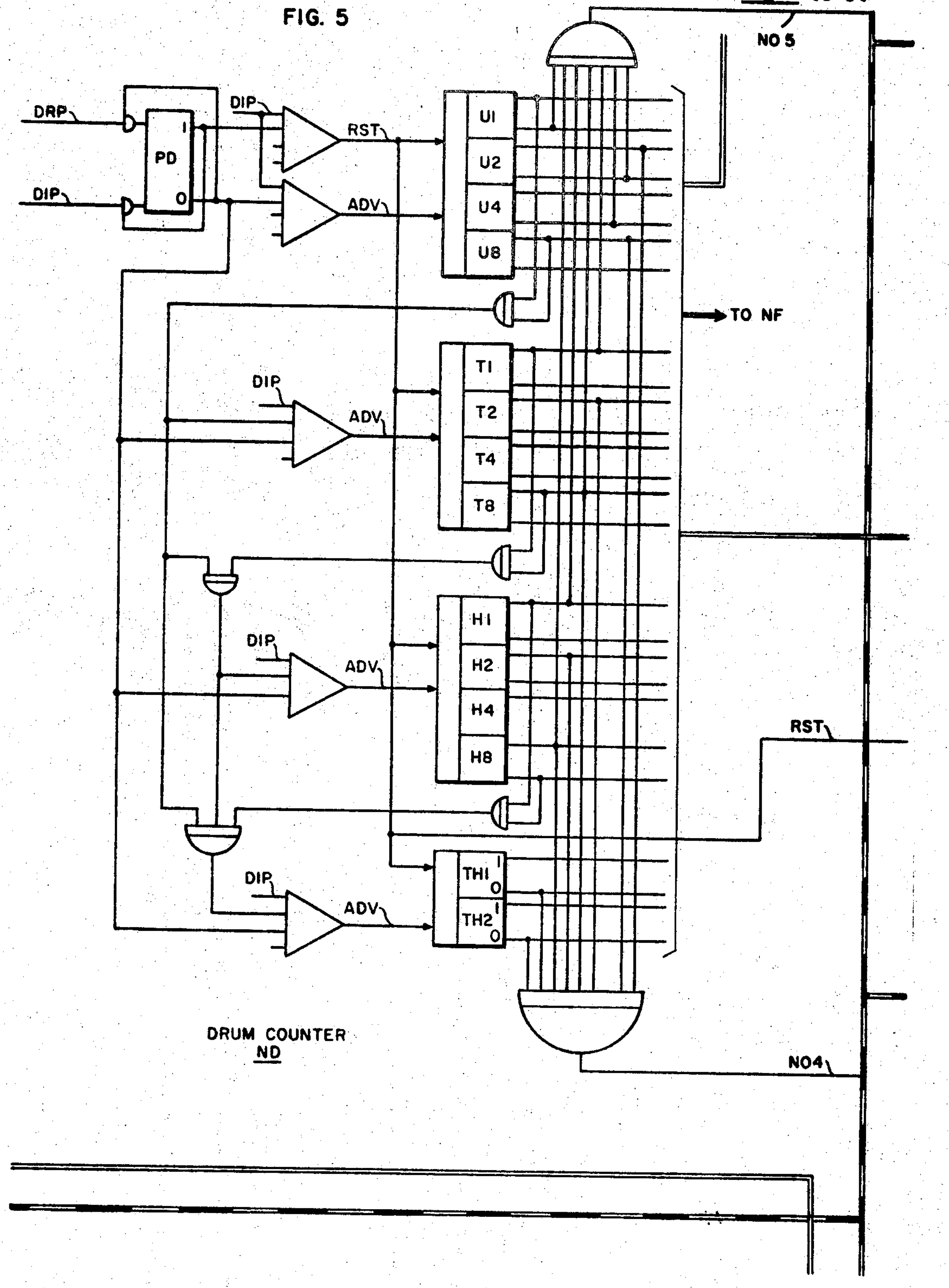
FIGURE 5 shows the drum counter circuit used for counting the pulses from the pulse distribution circuit to provide the drum address location identity.
Figure 6:
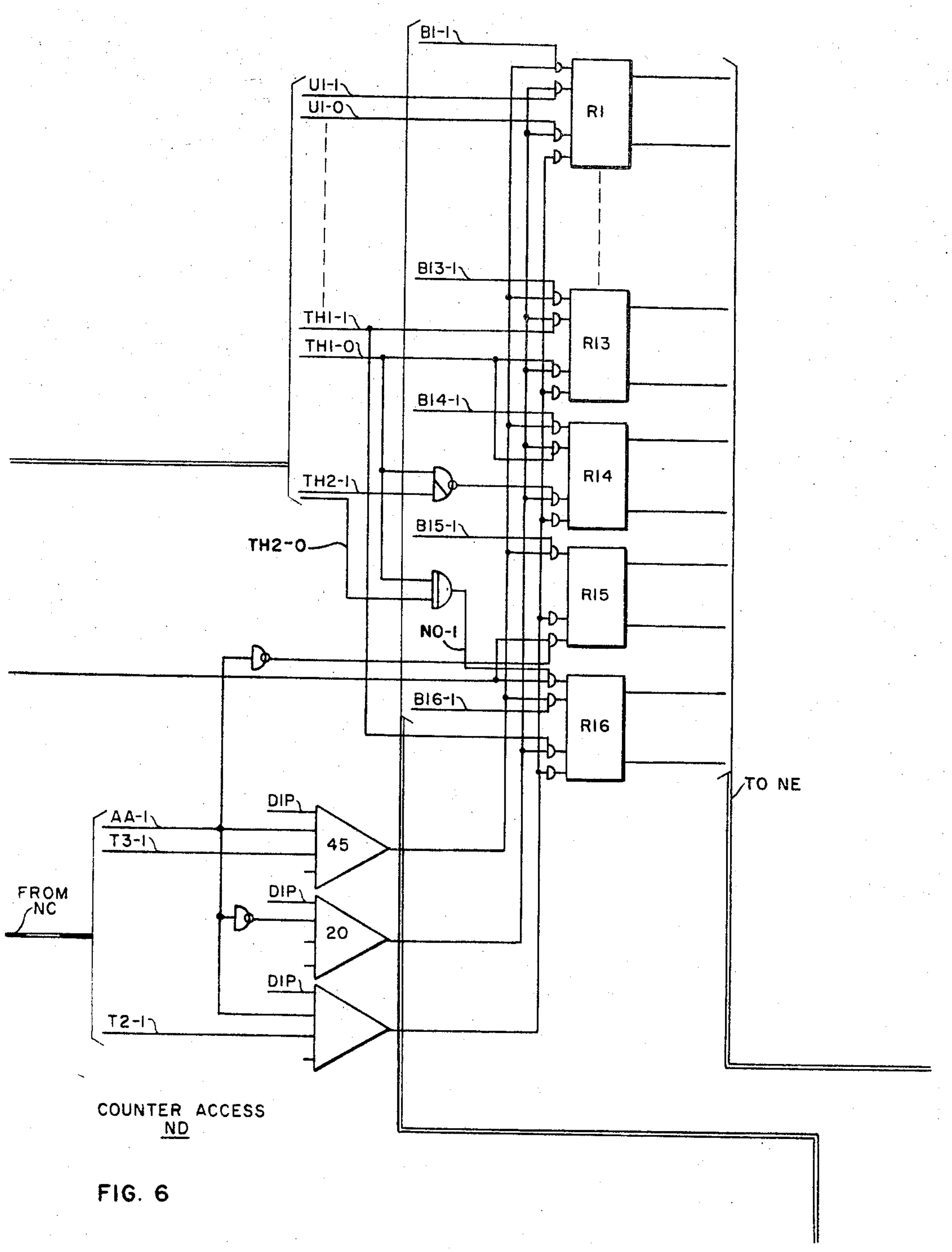
FIGURE 6 shows the counter access circuit for buffering the output of the counter circuit.

Electronic logic circuits used in this system described employ as standard building blocks NOR gates, inverters, flip-flops, and gated pulse amplifiers. Each of the flip-flops such as for example L1 of FIG. 3 includes two transistors in a bistable circuit configuration. Each flip-flop is provided with four coincidence gates for input, either one of the first two being used to set the flip-flop, and either one of the other two being used to reset the flip-flop. Each coincidence gate has an AC input and a DC input and requires coincidence of these two inputs to effect a change of state of the flip-flops. Some unused coincidence gates have been omitted in the drawings. The AC inputs are usually supplied with a train of recurring pulses from a clock source via a gated pulse amplifier. Each input coincidence gate of a flip-flop is arranged with a priming time so that DC input must be present for this period of time before the AC input will be effective. This priming time along with the switching and transmission delays in the previous circuits provides an arrangement in which a change of state of a flip-flop produced by one AC input pulse is not effective at the DC inputs of the same or other flip-flops to produce another change of state until receipt of the next clock pulse.

Gated pulse amplifiers are transistor circuits having a direct-coupled gating input arrangement and a capacitively coupled trigger pulse input terminal. A typical gated pulse amplifier is shown on FIG. 3 and designated CP2. When the two inputs coincide an output pulse is produced. The direct coupled gating is controlled via three input terminals and is effective when the first two of these inputs are true in coincidence, or the other input is true. Thus, each gated pulse amplifier has four inputs and are always shown such that the upper input is the pulse input, the next two inputs are direct coupled coincidence inputs, and the last is a single direct coupled input. The direct coupled inputs are so arranged that if one of the coincidence control inputs is not used the other is effective when true and not effective when false, and if the single direct coupled input is not used it is not effective.

The logical gates are implemented with NOR gates, each of which is a one transistor logical element whose output can either be considered an AND function of the negation of its inputs, or it can be considered as an OR function of its inputs followed by an inversion. The gates in the drawings are, however, shown as AND or OR gates, the AND gate is shown as a closed arc with another line parallel to the line closing the arc as illustrated by any of the input gates of FIG. 2; the OR gate is shown as a closed arc with another diagonal line inside as illustrated by the last gate of FIG. 2. A small circle or dot on any of the leads into or out of the gates indicates an inversion of the signal on that lead. The electronic units are shown in the drawing as having any number of inputs and output loads, but in actual implementation these would be limited by loading requirements well known in the art. Except for the clock pulses used for triggering at AC inputs of the flip-flops and gated pulse amplifier, the logic circuits in the system are direct coupled, that is, signals are represented by steady state voltages. Two levels are employed. The first level is usually the negative eight volts, although other negative values may be used, and represent the binary 1, true, on or active condition. The second level, ground potential, represents the binary zero, false, off or inactive condition. The flip-flops are used as registers with double rail output signals to drive the logic circuits. A double rail output is one in which both the logical one and zero conditions are represented by active signals on separate leads.

Only one of the two leads, however, has an active signal at any time. In the actual implementation most of the flip-flops and gate circuits are arranged such that the negative bias potential is provided at the input terminals of the gates and the DC inputs of the flip-flops, and this serves as the bias potential for the outputs of the preceding circuits. For the false condition, the flip-flops and gates provide a low resistance path to ground via a saturated transistor, and this ground potential is thereby applied at the inputs of the succeeding circuits. In describing the logical operations performed by the circuits, Boolean algebra equations are used. In this notation the addition symbol signifies OR, the multiplication symbol, expressed or implied, signifies AND, over-lining signifies the inverted condition, and the hyphenated expression such as NC-LC indicates the LC flip-flop of the control circuit (NC).

*Drum heads*

The allocation of the drum heads and their functional uses in a typical embodiment is presented below to facilitate an understanding of their relationship to the detailed descriptions of the individual circuits.

| Function | Bit Value | Head Designation | Description |
|---|---|---|---|
| DRP–N |  | G8 | Drum reset pulse, one pulse per drum revolution. |
| DIP–N |  | G37 | Drum index pulse, 3,000 pulses per drum revolution. |
| LC1 | 1 | W2 | Metering, units count. |
|  | 2 | W13 |  |
|  | 4 | W3 |  |
|  | 8 | W14 |  |
| LC2 | 1 | W25 | Metering, tens count. |
|  | 2 | W36 |  |
|  | 4 | W48 |  |
|  | 8 | W60 |  |
| LC3 | 1 | W4 | Metering, hundreds count. |
|  | 2 | W15 |  |
|  | 4 | W26 |  |
|  | 8 | W1 |  |
| LC4 | 1 | W12 | Metering, thousands count. |
|  | 2 | W23 |  |
|  | 4 | W34 |  |
|  | 8 | W46 |  |
| V | 1 | W58 | Local counter control bit. |
| LIC | 1 | W24–R24 | Line condition. |
| MT1 | 1 | W35–R35 | Metering condition. |

*Pulse distribution*

The pulse distribution circuit generates, amplifies and distributes the clock pulse trains necessary for the operation of the system. It makes use of gated pulse shapers (GPS1, GPS2), gated pulse drivers (GPD1–GPD5) and gated pulse amplifiers GP1, GP2 as well as inverters (INV1, INV2) to provide the required delays and shaping of pulses.

Timing is derived from the two master clock tracks recorded on the drum, one track providing 3000 pulses per drum revolution the other providing 2999 per revolution.

The DIP (Drum Index Pulse), DIPR (Drum Index Pulse Reset) and CWP (Clock Write Pulse) pulse trains are derived from one written track which is read out continuously through read amplifiers R1–R2.

DRP (Drum Reset Pulse) is derived from the second written track, being read out through read amplifiers R3–R4, delayed and shaped to give one pulse per revolution.

The loading of the DIP clock train being very large they are buffered through gated pulse amplifiers and distributed throughout the system.

*Signals*

DIPR–1=DIP NS–LR read out of LIC-(line condition) and MT1 (metering)

DIPR–2=DIP NC–CO1 (read out of meter position)

CWP–1=DIP NC–LW (write-in on LIC and MT1)

CWP–2=DIP NC–CO2 (write-in of meter position)

CWP–3=DIP NC–CO3 (write-in of V bit)

*Drum counter (ND)*

The drum counter is used to count up to 3000 positions around the drum circumference. It is directly stepped by the DIP pulse. It consists of four decades. The units, tens, and hundreds decades each employ four flip-flops coded in binary decimal form utilizing 10 to represent zero thus eliminating the all zero code. The thousands decade consists of two flip-flops utilizing the "1" and "2" weighted bits of the code.

The counter contains its own pulse distributor and advance circuit.

The output of the counter is fed directly to the access circuit and to the counter access circuit which presents its output to the console register.

*Units, tens and hundreds decades*

The units decade is represented by a four stage binary counter utilizing the 1–2–4–8 weighted code. The code is shown in the following table:

| Dec. | U8 | U4 | U2 | U1 |
|---|---|---|---|---|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 0 |

The circuit consists primarily of four flip-flops (U1, U2, U4 and U8), and the logic circuitry for the proper logic commands to the DC sets and resets of the flip-flops, while the corresponding AC sets and resets are tied together and fed by the drum index pulse DIP. A second set of AC sets and resets are tied together and fed by the drum reset pulse RST. In this manner the RST pulse is used to force the counter into the reset state, i.e., U1=0, U2=1, U4=0 and U8=1.

The tens decade consists of four flip-flops (T1, T2, T4 and T8) with the associated logic. The hundreds decade also consists of four flip-flops (H1, H2, H4, and H8) and their associated logic. The tens and hundreds decades are identical to the units decade as far as the logic presented to the DC controls of the binary decimal weighted flip-flops. The tens decade is stepped with the ADV–T pulse, and the hundreds decade is stepped with the ADV–H pulse.

*Thousands decade*

The thousands decade is a two stage binary counter. The circuit consists of two flip-flops (TH1 and TH2) and the necessary logic for the DC sets and resets of the flip-flops. The corresponding AC sets and resets are tied together and fed by the thousands counter advance pulse ADV–TH. The other AC inputs are connected together and fed by the reset pulse RST.

The thousands decade output and the code as converted by the counter access register is shown below.

| Counter thousands | | | Code |
|---|---|---|---|
| Pos. | TH1 | TH2 | |
| 1 | 0 | 0 | 0 1 0 1 |
| 2 | 1 | 0 | 1 0 0 0 |
| 3 | 0 | 1 | 0 1 0 0 |

The conditions for setting and resetting each counter flip-flop as the count is advanced is presented in the following equations in Boolean form.

*Counter*

NOTE: ADV–U=DIP $\overline{PD}$
RST=DIP PD
ADV–T=DIP $\overline{PD}$ U1 U8
ADV–H=DIP $\overline{PD}$ U1 U8 T1 T8
ADV–TH=DIP $\overline{PD}$ U1 U8 T1 T8 H1 H8

| FF | Set | Reset |
|---|---|---|
| PD | DRP $\overline{PD}$ | DIP PD |
| U1 | ADV-U $\overline{U1}$ | ADV-U U1 + RST U1 |
| U2 | ADV-U U1 $\overline{U2}$ + RST | ADV-U U2 (U1 + U8) |
| U4 | ADV-U U1 U2 $\overline{U4}$ | ADV-U U1 U2 U4 + RST |
| U8 | ADV-U U1 U2 U4 + RST | ADV-U U2 U8 |
| T1 | ADV-T $\overline{T1}$ | ADV-T T1 + RST T1 |
| T2 | ADV-T T1 $\overline{T2}$ + RST | ADV-T T2 (T1 + T8) |
| T4 | ADV-T T1 T2 $\overline{T4}$ | ADV-T T1 T2 T4 + RST |
| T8 | ADV-T T1 T2 T4 + RST | ADV-T T2 T8 |
| H1 | ADV-H.$\overline{H1}$ | ADV-H H1 + RST H1 |
| H2 | ADV-H H1 $\overline{H2}$ + RST | ADV-H H1 H2 (H1 + H8) |
| H4 | ADV-H H1 H2 $\overline{H4}$ | ADV-H H1 H2 H4 + RST |
| H8 | ADV-H H1 H2 H4 + RST | ADV-H H2 H8 |
| TH1 | ADV-TH $\overline{TH1}$ | ADV-TH TH1 + RST |
| TH2 | ADV-TH TH1 $\overline{TH2}$ | ADV-TH TH1 TH2 + RST |

*Counter access circuit*

The counter access register is an intermediate buffer between the drum counter, buffer register and the console register circuit, and also provides the necessary coding of the counter output.

The counter access register consists of 16 flip-flops (R1–R16) and the associated pulse distributors.

The flip-flops are each set by the corresponding counter flip-flop output or the corresponding buffer register flip-flop output as determined by the pulse distributors.

The conditions for loading the access register are presented below.

*Counter access register*

NOTE: CP1=DIP NC–$\overline{AA}$
CP2=DIP NC–AA NC–T3
CP3=DIP NC–AA NC–T2

| FF | Set | Reset |
|---|---|---|
| R1 | CP1 U1 + CP2 NG-B1 | CP1 $\overline{U1}$ + CP3 |
| R2 | CP1 U2 + CP2 NG-B2 | CP1 $\overline{U2}$ + CP3 |
| R3 | CP1 U4 + CP2 NG-B3 | CP1 $\overline{U4}$ + CP3 |
| R4 | CP1 U8 + CP2 NG-B4 | CP1 $\overline{U8}$ + CP3 |
| R5 | CP1 T1 + CP2 NG-B5 | CP1 $\overline{T1}$ + CP3 |
| R6 | CP1 T2 + CP2 NG-B6 | CP1 $\overline{T2}$ + CP3 |
| R7 | CP1 T4 + CP2 NG-B7 | CP1 $\overline{T4}$ + CP3 |
| R8 | CP1 T8 + CP2 NG-B8 | CP1 $\overline{T8}$ + CP3 |
| R9 | CP1 H1 + CP2 NG-B9 | CP1 $\overline{H1}$ + CP3 |
| R10 | CP1 H2 + CP2 NG-B10 | CP1 $\overline{H2}$ + CP3 |
| R11 | CP1 H4 + CP2 NG-B11 | CP1 $\overline{H4}$ + CP3 |
| R12 | CP1 H8 + CP2 NG-B12 | CP1 $\overline{H8}$ + CP3 |
| R13 | CP1 TH1 + CP2 NG-B13 | CP1 $\overline{TH1}$ + CP3 |
| R14 | CP1 TH1 + CP2 NG-B14 | CP1 TH1 $\overline{TH2}$ + CP3 |
| R15 | CP2 NG-B15 | CP1 + CP3 |
| R16 | CP1 $\overline{TH1}$ $\overline{TH2}$ + CP2 NG-B16 | CP1 TH1 + CP3 |

*Signals*

N01=$\overline{TH1}$ $\overline{TH2}$
N04=U2 U8 T2 T8 H2 H8 $\overline{TH1}$ $\overline{TH2}$
N05=$\overline{U1}$ $\overline{U2}$ $\overline{U4}$ T1 T8 H1 H8 TH1

*Access circuit (NA)*

The line access circuit operates as an alloter and identifier, the coincidence of the operated metering contacts associated with each subscriber and a pulse corresponding in time with the lines identity produces an FL signal output as described below. See FIGURE 2.

In the line access circuit the two make contacts of a metering relay produce an FL signal corresponding to the condition of the line at the corresponding number position of the drum counter. FL indicates an operated metering relay, $\overline{FL}$ indicating an unoperated metering relay.

Figure 1:
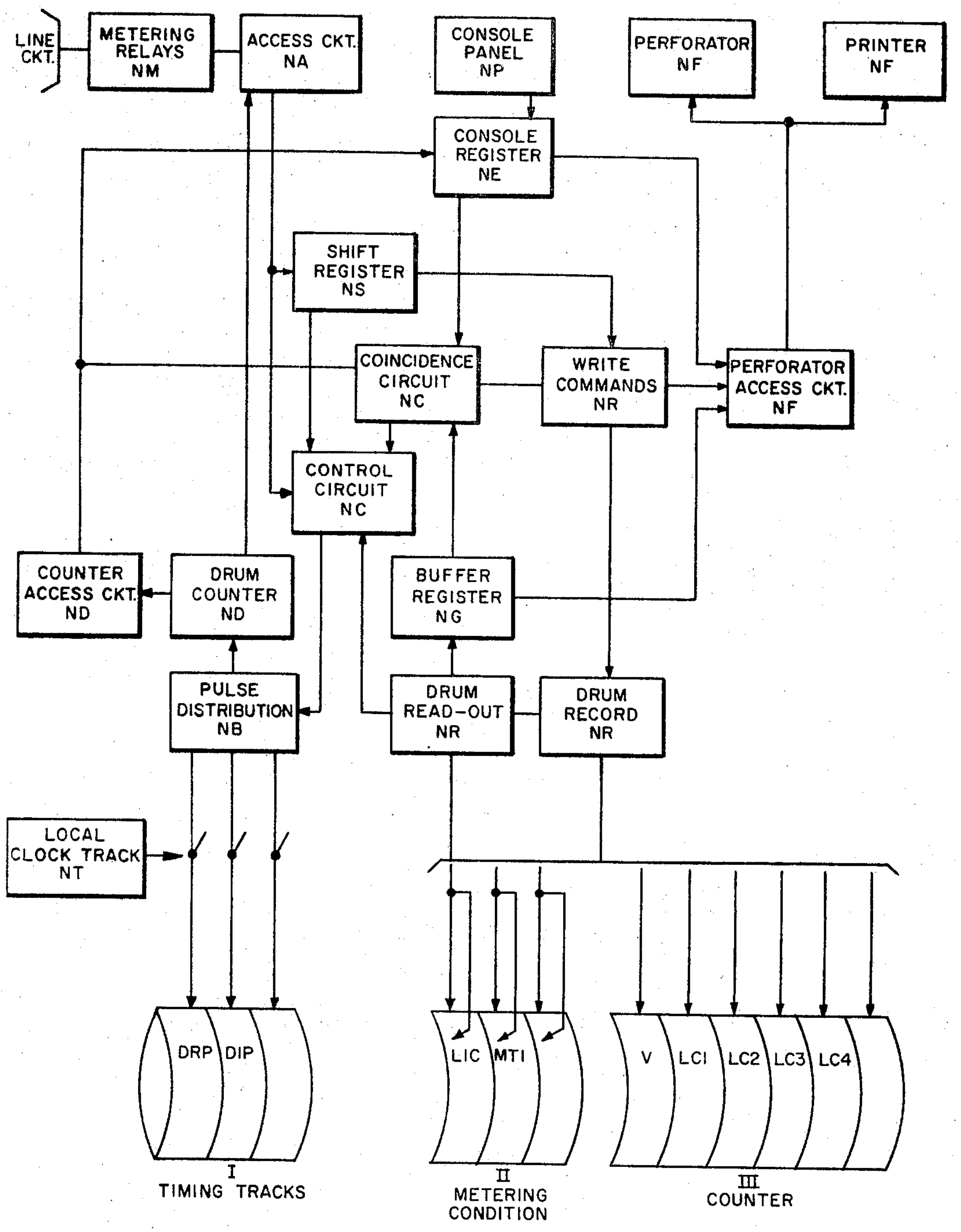
Figure 2:
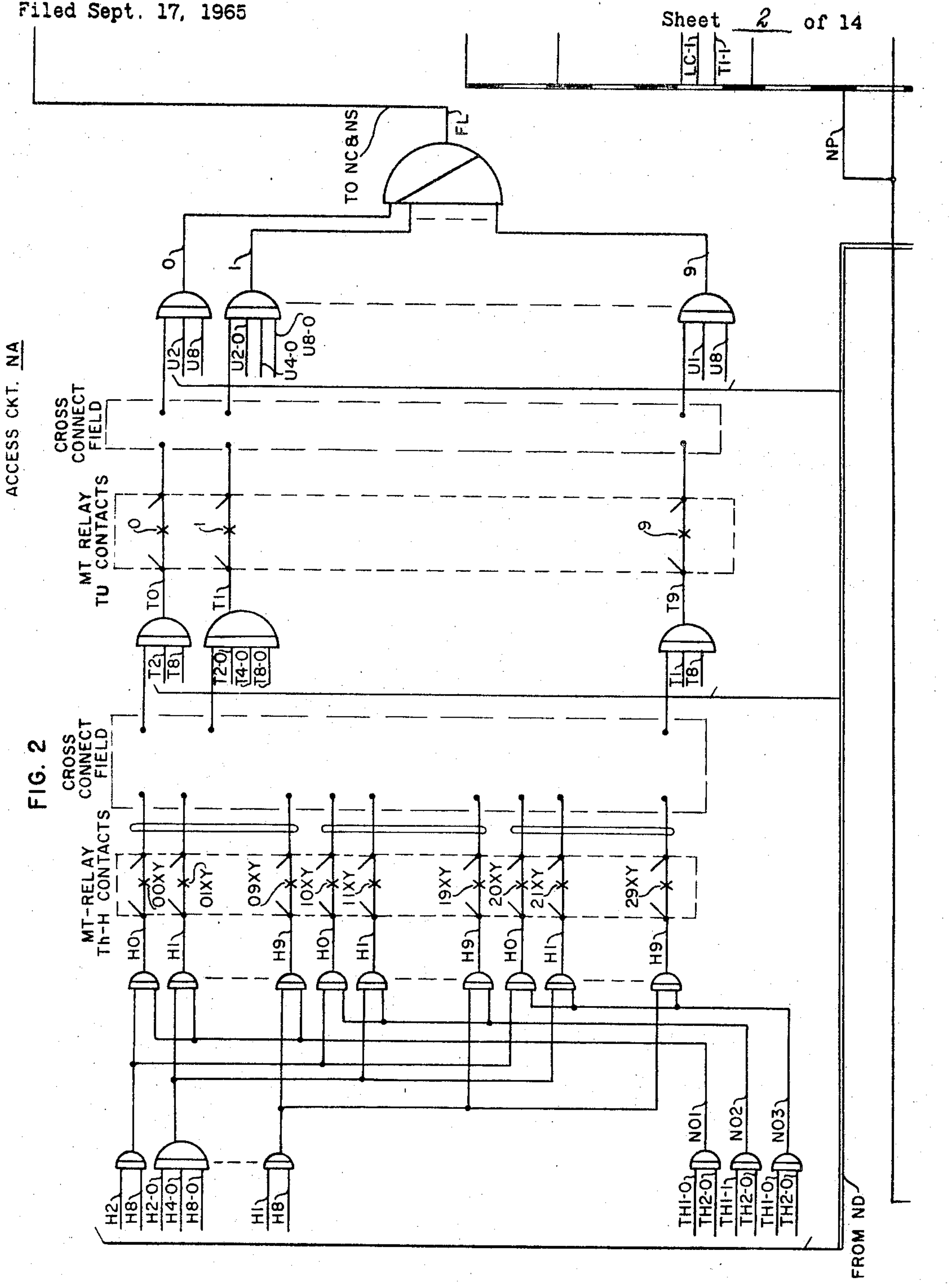
FIGURE 2 shows the access circuit in schematic form and includes the metering relay contacts to show the manner of interconnecting them to identify the line circuit requiring metering.

In an access circuit for 3,000 line numbers there are 30 hundreds groups (see FIG. 2). These are indicated by the three groups of 10 leads each designated H0 through H9 to the left of the TH–*h* contacts of the MT relays. The 10 leads H0–H9 of the first hundreds group correspond to the TH–*h* contact 00XY through 09XY, the 10 leads H0–H9 of the second hundreds group correspond to the TH–*h* contacts 10XY through 19XY, and 10 leads H0–H9 of the third hundreds group correspond to the TH–*h* contacts 20XY through 29XY. These thirty leads as shown on the left side of the box labeled TH–*h* contacts are multiplied to the MT metering relays having the corresponding thousands and hundreds digits in their directory number. Thus each of these thirty leads will be multiplied to 100 TH–*h* contacts of the MT relays for a fully equipped 1000 line office. The other terminals of these contact sets are connected in the cross connect field shown to the right of the contacts in ten groups of 300 leads, having a common tens digit. The ten leads resulting from such a grouping are then each connected to the input of an AND-gate, to which are also connected the drum counter tens digit flip-flop outputs. The ten leads designated T0–T9 are again brought to the metering relays of the lines having a corresponding tens digit in their directory number and selectively wired to another set of contacts labeled TU. The other terminals of these TU contact sets are taken to the cross-connect field shown to the right of the contacts again, at a ten leads having a common tens digit and there regrouped according to their common units digit. The ten leads from this cross-connect field are each connected to the input of a correspondingly numbered AND-gate, to which are also connected the corresponding drum counter units digit flip-flop outputs. The output 0–9 of these AND-gates are then OR-gated to a single FL lead.

In this manner we determine a single path for all 3,000 lines, and they all have access to produce a single FL signal in their individual time slot.

*Shift register (NS)*

The FL signal is passed to the shift register where it is effective to initiate the line condition shift register and the metering shift register. These registers operate to delay the writing in on the LIC and MT1 tracks by a distance equal to 35 DIP pulses. This delay is required because of the physical position of the write heads relative to the read heads for these particular tracks.

An alarm circuit is provided to check against the possibility of a flip-flop malfunction. The output of flip-flops L2 and M2 (FIG. 3) are and-gated to a flip-flop AC to initiate operation of an auxiliary counter consisting of flip-flops A1–A6 and the incidental logic to count 35 shift pulses. After the 35th shift pulse the outputs of flip-flops L37 and M37 are gated together with the output of the counter and if both of the shift register outputs are not alike at this point of operation the AL flip-flop is set, indicating an alarm condition. The output of the AL flip-flop is taken to the write command circuit to inhibit writing on the drum, as well as to give a visual or audible signal.

After the line condition and metering tracks have been written, this condition will be read during the subsequent passage under the read heads R36 and R4 respectively to set flip-flops LIC and MT1. The output of flip-flops LIC and MT1 serves to set flip-flops LC and T1 in the control circuit.

Should a second FL signal be received for the same subscriber, before the preceding metering pulse was recorded in the metering count section of the drum and erased from the MT1 track, it will initiate operation of the L1 to L38 shift register, but will be blocked at gate 32 from initating the operation of M1 through M38.

The equations stating the conditions for each of the flip-flops follow.

Note: CP1=DIP AC
CP2=DIP NP SZ
CP3=DIP NP $\overline{\text{SZ}}$

| FF | Set | Reset |
|---|---|---|
| A1 | CP1 $\overline{\text{A1}}$ | CP1 A1 + CP2 |
| A2 | CP1 A1 $\overline{\text{A2}}$ | CP1 A1 A2 + CP2 |
| A3 | CP1 A1 A2 $\overline{\text{A3}}$ | CP1 A1 A2 A3 + CP2 |
| A4 | CP1 A1 A2 A3 $\overline{\text{A4}}$ | CP1 A1 A2 A3 A4 +$\overline{\text{C}}\overline{\text{P2}}$ |
| A5 | CP1 A1 A2 A3 A4 $\overline{\text{A5}}$ | CP1 A1 A2 A3 A4 A5 + CP2 |
| A6 | CP1 A1 A2 A3 A4 A5 | CP1 A1 A2 A3 A4 A5 A6 + CP2 |
| AC | NB-DIP (L2 M2 + $\overline{\text{L2}}$ $\overline{\text{M2}}$) $\overline{\text{A}}\overline{\text{C}}$ | DIP A4 A6 ($\overline{\text{L43}}$ $\overline{\text{M43}}$ + $\overline{\text{L}}$43 M43) + CP2 |
| AL | NB-DIP A2 A6 $\overline{\text{(L37 M37 + }\overline{\text{L37}}\ \overline{\text{M37}}\text{)}}$ | CP2 |
| | SHIFT REGISTER | |
| LIC | NR-PBS18 $\overline{\text{LIC}}$ | NR-PBR18 LIC + CP2 |
| L1 | CP3 NA-FL | CP3 NA-$\overline{\text{FL}}$ + CP2 |
| L2 | CP3 L1 | CP3 $\overline{\text{L1}}$ + CP2 |
| L3 | CP3 L2 | CP3 $\overline{\text{L2}}$ + CP2 |
| . | . | . |
| . | . | . |
| . | . | . |
| L38 | CP3 $\overline{\text{F}}$37 | CP3 $\overline{\text{L37}}$ + CP2 |
| MT1 | NR-PBS19 $\overline{\text{MT1}}$ | NR-PBR19 MT1 + CP2 |
| M1 | CP3 ($\overline{\text{LIC}}$ NA-F$\overline{\text{P}}$ + $\overline{\text{MT1}}$) | CP3 ($\overline{\text{LIC}}$ $\overline{\text{NA}}$-$\overline{\text{FL}}$ $\overline{+}$ $\overline{\text{MT1}}$) + CP2 |
| M2 | CP3 M1 $\overline{\text{M1}}$ $\overline{\text{NC}}$ $\overline{\text{LC}}$ $\overline{\text{NC}}$-$\overline{\text{T1}}$ | NB-DIP-3 M1 NC-LC NC-T1-CP3 + CP3 $\overline{\text{M1}}$ |
| M3 | CP3 M2 | CP3 $\overline{\text{M2}}$+CP2 |
| . | . | . |
| . | . | . |
| . | . | . |
| M38 | CP3 M37 | CP3 $\overline{\text{M37}}$ + CP2 |

*Drum record and read circuit (NR)*

Information that has been recorded on the magnetic drum can be changed at will simply by recording the new information over the old information. Since saturation recording is used, only sufficient current must pass through the head to place the coating in a saturated state, and thereby automatically erase the old information.

To allow the system to write correctly on the magnetic drum, two conditions must be satisfied:

(1) The correct information instruction, i.e., one or zero must be present at the write amplifier input.

(2) The write amplifier must perform its writing function at the correct time.

Each of the write amplifiers has three inputs; two of the inputs are under control of the write commands, while the third input CWP1, CWP2, CWP3 is under control of the control circuit through the pulse distribution.

The two information inputs from the write commands set the amplifiers so that the one or zero side of the write amplifiers will write when the correct time occurs.

The CWP1, CWP2 and CWP3 (coincident write pulse) edges of consecutive coincident write pulses. A strobing pulse DIPR is introduced during the first half of the bit cell to set and reset the buffer register NG flip-flops.

Figure 11:
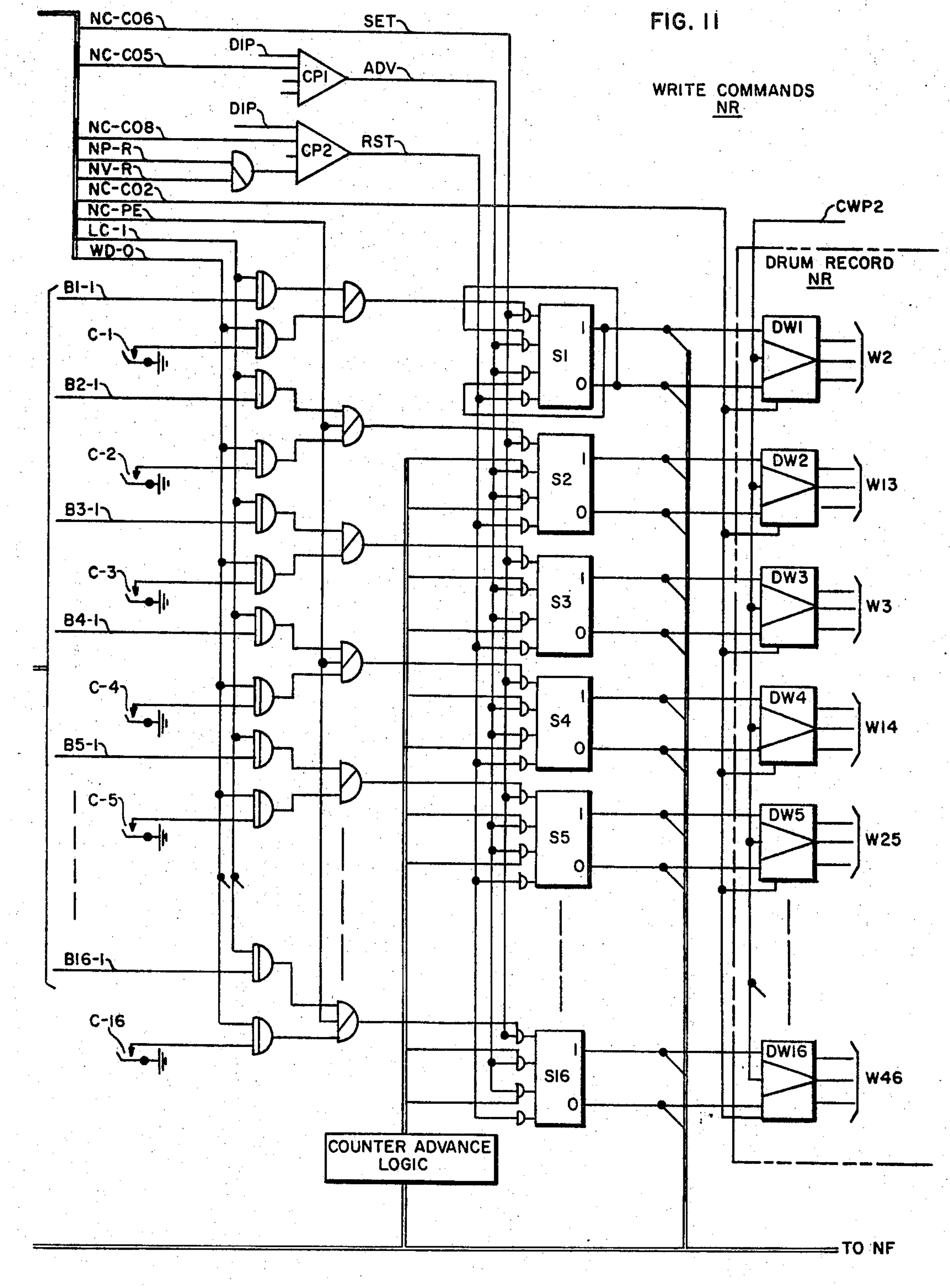
FIGURE 11 shows the drum record circuits, write command circuit and the recording amplifiers, also the console keys for loading the write command circuit are shown on this figure.
Figure 12:
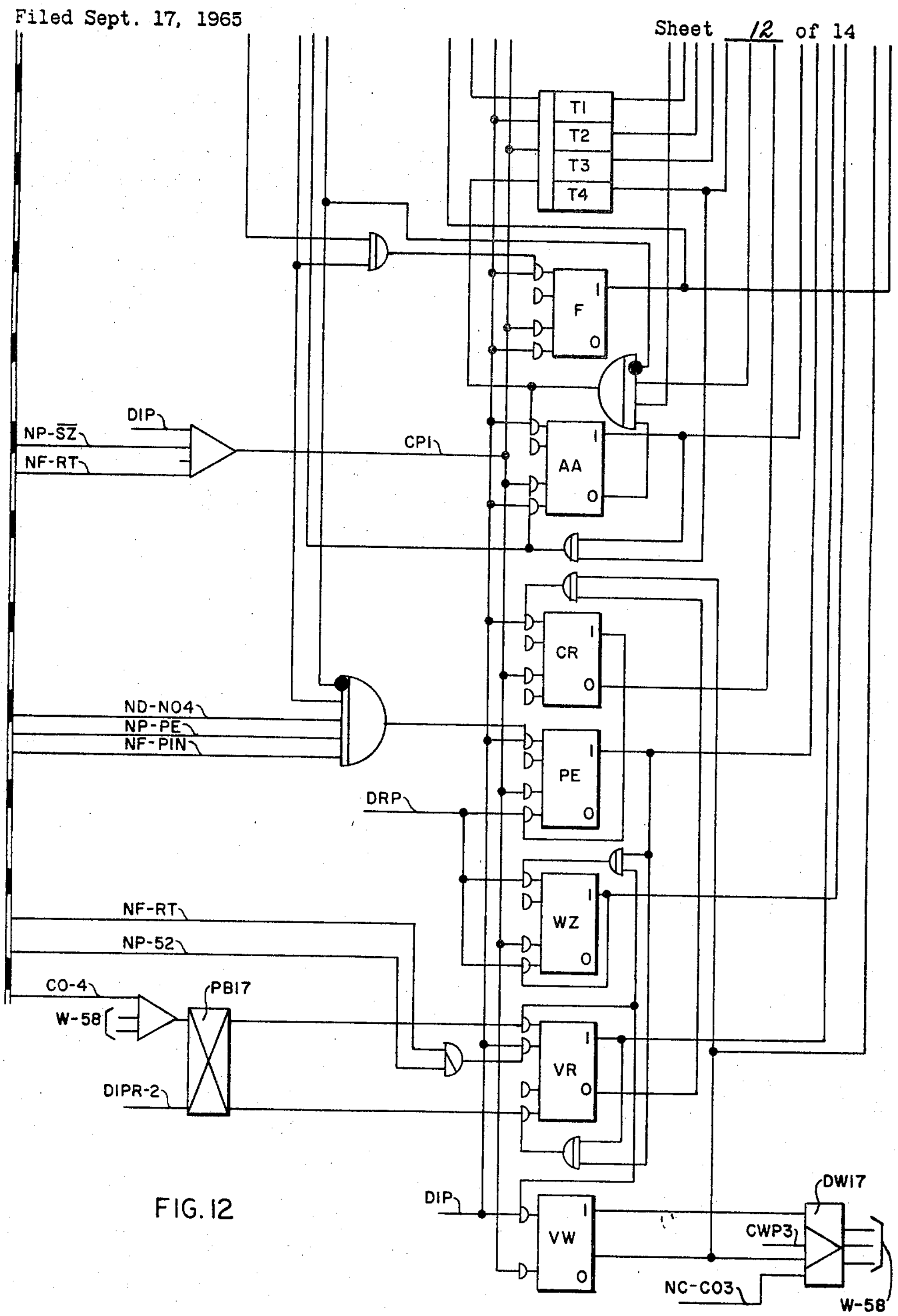
Figure 13:
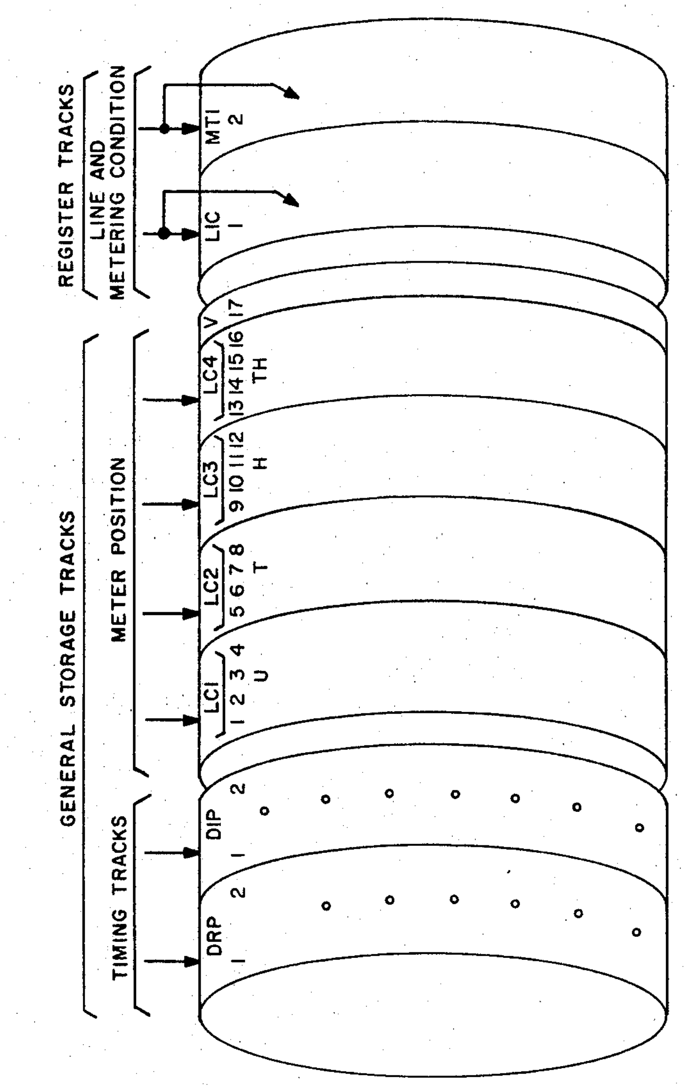
FIGURE 13 illustrates the layout of the drum.
Figure 16:
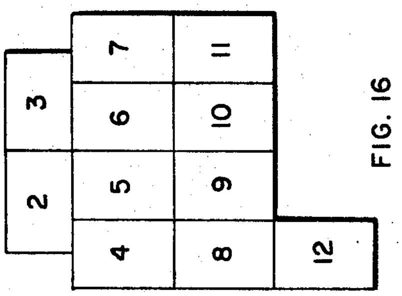
FIGURE 16 illustrates the layout of FIGURES 2–12 to form a unitary system.
Figure 14:
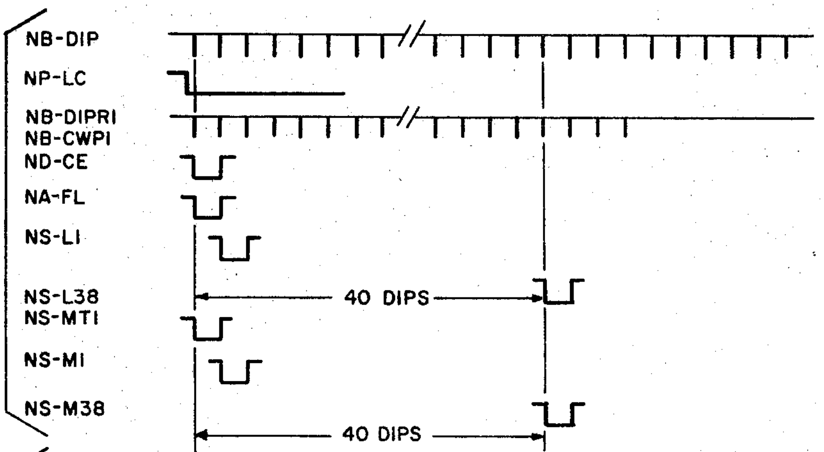
FIGURE 14 is a chart showing the timing of the write-in for the line and metering condition.
Figure 15:
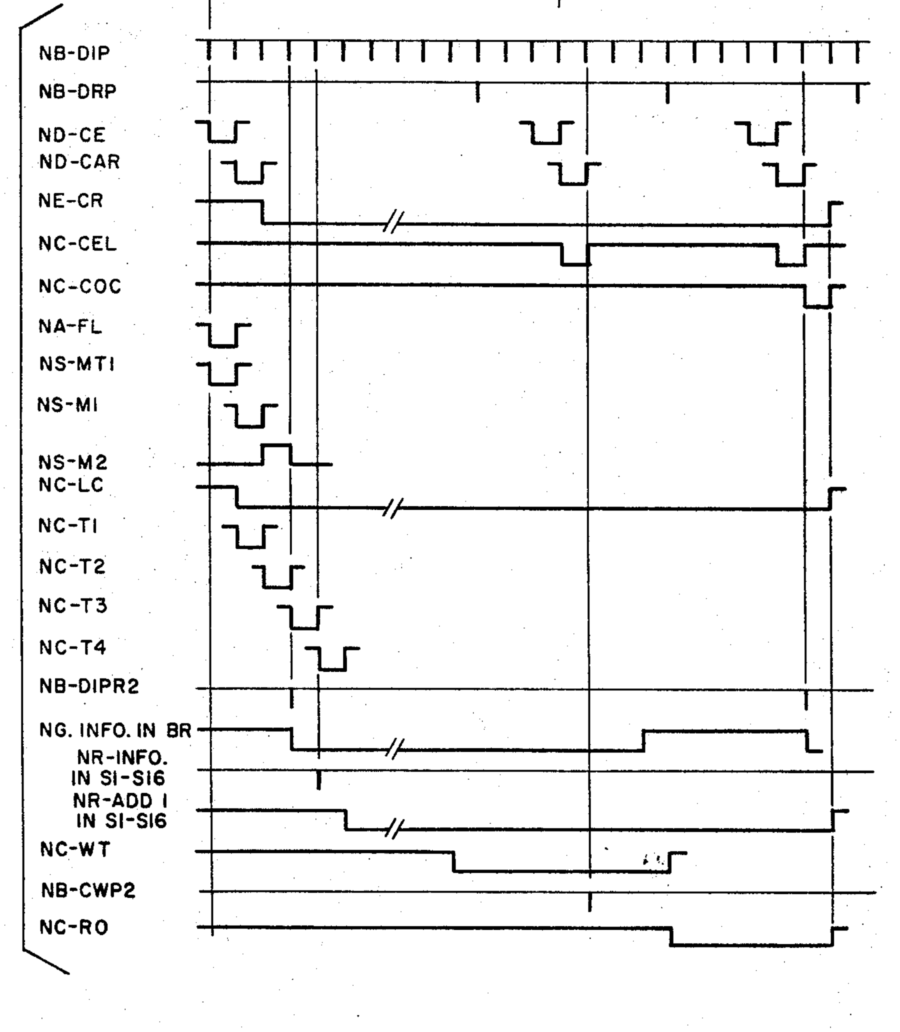
FIGURE 15 is a chart showing the timing of the metering operation.

The console panel keys (signals C1 to C6) shown in FIG. 11, are used for keying in the information into the drum record circuit through the write command circuit.

C1 to C4 set units, in units counter S1 to S4

C5 to C8 tens in counter S5 to S8

C9 to C12 hundreds, in hundreds counter S9 to S12

C13 to C16 thousands, in thousands counter S13 to S16

The counter is changed with:

(a) NC–CO5 (NG–B1—NG–B16), to add one unit during the normal metering operation, (b) NC–CO6 (NP–C1—NP–C16), to write in the information from the console panel.

(c) NC–CO8 NS DIP to reset the counter to the zero position, during counter reset.

The conditions for setting and resetting each of the flip-flops and for providing the output signals is presented below in tabular form.

NOTE: CP1=DIP–NC–CO5 (advanced)
CP2=DIP NC–CO8 (reset)

| FF | Set | Reset |
|---|---|---|
| S1 | NC-CO6 (NC-LC NG-B1 + NC-F NP- C1) + CP1 $\overline{S1}$ | CP1 S1 $\mp$ CP2. |
| S2 | NC-CO6 (NC-LC NG-B2 + NC-F NP- C2 + CP1 NC-PE) + CP1 S1 $\overline{S2}$ | CP1 S2 (S1 $\mp$ S4) $\mp$ CP2 |
| S3 | NC-CO6 (NC-LC NG-B3 + NC-F NP- C3) + CP1 S1 S2 $\overline{S3}$ | CP1 S1 S2 S3 $\mp$ CP2 |
| S4 | NC-CO6 (NC-LC NG-B4 + NC F NP- C4 + NC-PE) + CP1 S1 S2 S3 | CP1 S2 S4 $\mp$ CP2 |
| S5 | NC-CO6 (NC-LC NG-B5 + NC-F NP- C5) + CP1 S1 S4-$\overline{S5}$ | CP1 S1 S4 S5 $\mp$ CP2 |
| S6 | NC-CO6 (NC-LC NG-B6 + NC-F NP- C6 + NC-PE) + CP1 S1 S4 S5 $\overline{S6}$ | CP1 S1 S4 S6 (S5 $\mp$ S8) $\mp$ CP2 |
| S7 | NC-CO6 (NC-LC NG-B7 + NC-F NP-C7) + CP1 S1 S4 S5 S6 $\overline{S7}$ | CP1 S1 S4 S5 S6 S7 $\mp$ CP2 |
| S8 | NC-CO6 (NC-LC NG-B8 + NC-F NP- C8 + NC-PE) + CP1 S1 S4 S5 S6 S7 | CP1 S1 S4 S6 S8 $\mp$ CP2 |
| S9 | NC-CO6 (NC-LC NG-B9 + NC-F NP- C9) + CP1 S1 S4 S5 S8 $\overline{S9}$ | CP1 S1 S4 S5 S8 S9 $\mp$ CP2 |
| S10 | NC-CO6 (NC-LC NG-B10 + NC-F NP- C10 + NC-PE) + CP1 S1 S4 S5 S8 S9 $\overline{S10}$ | CP1 S1 S4 S5 S8 S10 (S9 $\mp$ S12) $\mp$ CP2 |
| S11 | NC-CO6 (NC-LC NG-B11 + NC-F NP- C11) + CP1 S1 S4 S5 S8 S9 S10 $\overline{S11}$ | CP1 S1 S4 S5 S8 S9 S10 S11 $\mp$ CP2 |
| S12 | NC-CO6 (NC-LC NG-B12 + NC-F NP- C12 + NC-PE) + CP1 S1 S4 S5 S8 S9 S10 S11 | CP1 S1 S4 S5 S8 S10 S12 $\mp$ CP2 |
| S13 | NC-CO6 (NC-LC NG-B12 + NC-F NP- C13) + CP1 S1 S4 S5 S8 S9 S12 $\overline{S13}$ | CP1 S1 S4 S5 S8 S9 S12 S13 $\mp$ CP2 |
| S14 | NC-CO6 (NC-LC NG-B14 + NC-F NP- C14 + NC-PE) + CP1 S1 S4 S5 S8 S9 S12 S13 $\overline{S14}$ | CP1 S1 S4 S5 S8 S9 S12 S14 (S13 $\mp$ S16) $\mp$ CP2. |
| S15 | NC-CO6 (NC-LC NG-B15 + NC F NP- C15) + CP1 S1 S4 S5 S8 S9 S12 S13 S14 $\overline{S15}$ | CP1 S1 S4 S5 S8 S9 S12 S14 S15 $\mp$ CP2 |
| S16 | NC-CO6 (NC-LC NG-B16 + NC-F NP- C16 + NC-PE) + CP1 S1 S4 S5 S8 S9 S12 S13 S14 S15 | CP1 S1 S4 S5 S8 S9 S12 S14 S16 $\mp$ CP2 |

inputs are pulses generated in the pulse distribution circuit (NB) when the correct bit cell is under the head.

CWP1 is generated by gating DIP with NP–LW.

CWP2 is generated by gating DIP with (WT + WZ + WO $\overline{WD}$) CEL.

CWP3 is generated by gating DIP with (WZ + WD $\overline{WD}$) CEL.

The purpose of the write amplifier is to switch a pulse of writing current through the drum heads when commanded to do so by the system logic. Since balanced heads are used, the circuits for the write one side and the write zero side are identical and share a common pulse source.

The final output of the read amplifiers is a train of square waves whose position relative to a bit cell contains the stored information on the drum. The function of the playback switch is to interpret this information and then use the signals thus generated to set the recovered information into the buffer register.

The convention has been established in this system that the information will be determined by the level of the read amplifiers output during the first half of the bit cell. The bit cell is defined by the time between the leading

*Drum record circuit*

| | | |
|---|---|---|
| DW1 | S1 NB-CWP2 NS-CO2 | $\overline{S1}$ NB-CWP2 NS CO2 |
| DW2 | S2 NB-CWP2 NS-CO2 | $\overline{S2}$ NB-CWP2 NS-CO2 |
| DW3 | S3 NB-CWP2 NS-CO2 | $\overline{S3}$ NB-CWP2 NS-CO2 |
| DW4 | S4 NB-CWP2 NS-CO2 | $\overline{S4}$NBCWP2 NS-CO2 |
| DW5 | S5 NB-CWP2 NS-CO2 | $\overline{S5}$ NB-CWP2 NS-CO2 |
| DW6 | S6 NB-CWP2 NS-CO2 | $\overline{S6}$ NB-CWP2 NS-CO2 |
| DW7 | S7 NB-CWP2 NS-CO2 | $\overline{S7}$ NB-CWP2 NS-CO2 |
| DW8 | S8 NB-CWP2 NS-CO2 | $\overline{S8}$ NB-CWP2 NS-CO2 |
| DW9 | S9 NB-CWP2 NS-CO2 | $\overline{S9}$ NB-CWP2 NS-CO2 |
| DW10 | S10 NB-CWP2 NS-CO2 | $\overline{S10}$ NB-CWP2 NS—CO2 |
| DW11 | S11 NB-CWP2 NS-CO2 | $\overline{S11}$ NB-CWP2 NS-CO2 |
| DW12 | S12 NB-CWP2 NS-CO2 | $\overline{S12}$ NB-CWP2 NS-CO2 |
| DW13 | S13 NB-CWP2 NS-CO2 | $\overline{S13}$ NB-CWP2 NS-CO2 |
| DW14 | S14 BN-CWP2 NS-CO2 | $\overline{S14}$ NB-CWP2 NS-CO2 |
| DW15 | S15 NB-CWP2 NS-CO2 | $\overline{S15}$ NB-CWP2 NS-CO2 |
| DW16 | S16 NB-CWP2 NS-CO2 | $\overline{S16}$ NB-CWP2 NS-CO2 |
| DW17 | NC-VW NB-CWP3 NC-CO3 | NC-$\overline{VW}$ NB-CWP2 NC-CO3 |
| DW18 | NS-L38 NB-CWP1 NC-LW | NS-$\overline{L38}$ NB-CWP1 NC-LW |
| DW19 | NS-M38 NB-CWP1 NC-LW | NS-$\overline{M38}$ NB-CWP1 NC-LW |

*Drum read-out*

| | |
|---|---|
| PB1 | NB-DIPR-2 NC-$\overline{\text{CO4}}$ DH-W2 |
| PB2 | NB-DIPR-2 NC-$\overline{\text{CO4}}$ DH-W13 |
| PB3 | NB-DIPR-2 NC-$\overline{\text{CO4}}$ DH-W3 |
| PB4 | NB-DIPR-2 NC-$\overline{\text{CO4}}$ DH-W14 |
| PB5 | NB-DIPR-2 NC-$\overline{\text{CO4}}$ DH-W25 |
| PB6 | NB-DIPR-2 NC-$\overline{\text{CO4}}$ DH-W36 |
| PB7 | NB-DIPR-2 NC-$\overline{\text{CO4}}$ DH-W48 |
| PB8 | NB-DIPR-2 NC-$\overline{\text{CO4}}$ DH-W60 |
| PB9 | NB-DIPR-2 NC-$\overline{\text{CO4}}$ DH-W4 |
| PB10 | NB-DIPR-2 NC-$\overline{\text{CO4}}$ DH-W15 |
| PB11 | NB-DIPR-2 NC-$\overline{\text{CO4}}$ DH-W26 |
| PB12 | NB-DIPR-2 NC-$\overline{\text{CO4}}$ DH-W1 |
| PB13 | NB-DIPR-2 NC-$\overline{\text{CO4}}$ DH-W12 |
| PB14 | NB-DIPR-2 NC-$\overline{\text{CO4}}$ DH-W23 |
| PB15 | NB-DIPR-2 NC-$\overline{\text{CO4}}$ DH-W34 |
| PB16 | NB-DIPR-2 NC-$\overline{\text{CO4}}$ DH-W46 |
| PB17 | NB-DIPR-2 NC-$\overline{\text{CO4}}$ DH-W58 |
| PB18 | NB-DIPR-1 NS-LR DH-R24 |
| PB19 | NB-DIPR-1 NS-LR DH-R35 |

*Control circuit* (*NC*)

A flag mark FL from the access circuit NA sets the shift register NS into operation to delay the recording of the line condition and metering marks upon the drum until the correct area is below the recording heads. These markings on the drum upon passing the corresponding read heads, set the flip-flops LIC and MT1 of the shift register circuit to signal the control circuit that a metering operation is required for this particular marked line number.

The control circuit is the central control or sequencing and supervisory circuit. It provides the control or sequence advance signals to the associated circuits in response to signals from these circuits indicating their progress. The system will be in one of the following states:

LC=Counting (metering operation)
WO=Write operation with the console
RO=Read-out operation with the console
PE=Perforator (counter reset)

Each of these states will be controlled by the corresponding flip-flops. The control circuit contains the alarm signal BW (incorrect write-in or read-out operation), and MM (when one metering pulse was not written on the drum). The control circuit also contains the circuitry to generate the various command signals to the other circuits.

CO1=read-out pulse command for counter position
CO2=write pulse command for counter position
CO3=write pulse command for control bit of counter
CO4=D.C. command signal for the read amplifiers
CO5=reset command for the write commands
CO6=A.C. set command of the write commands
CO7=A.C. set-reset command of the console register
CO8=reset command signal for the console register and write commands
RP=printer command signal to perforator circuit, when the printer will be used
PN=position nine, command signal to the perforator circuit, when nine characters will be printed out
CO10=reset command for read-out In the control circuit, the signal from the shift register flip-flop MT1 is effective to set LC and T1 to start the timing operation. Command CO4 in response to the setting of flip-flop LC causes the read-out circuit NR to read the metering count from the drum. The timer T1–T4 will be stepped by the drum index pulses DIP for the next three pulses. The drum counter ND is continuously counting the drum address locations and has available in flip-flops UL to TH2 at any given instant the address of the meter count that is under the read or write heads for the line number corresponding to this count.

This address is also continually setting the buffer register R1–R16 of the drum counter circuit ND as long as AA is not set. The console register NE consisting of flip-flops R1–R16 is set with the address of the line circuit requiring a metering operation upon the control circuit flip-flops LC and T1 being set. This address is retained in the console register during the interval of the metering process. Flip-flop LC upon being set will also condition with T2 a group of logic circuits to send command CO1 to the pulse distribution circuit for gating out pulse DIPR2. DIPR2 will enable gates PB1–PB16 to transfer the count to the buffer register NG, flip-flops B1–B16 and PB17 to flip-flop VR in the control circuit to indicate that a read out has been made.

During timer position T3 the command CO6 is sent to have the contents of B1–B16 transferred to flip-flop S1–S16 of the drum record and read circuit NR.

Then during the T4 interval the command CO5 is sent to advance the count by one unit. The drum counter output is at all times displayed at the drum counter buffer register.

Figure 8:
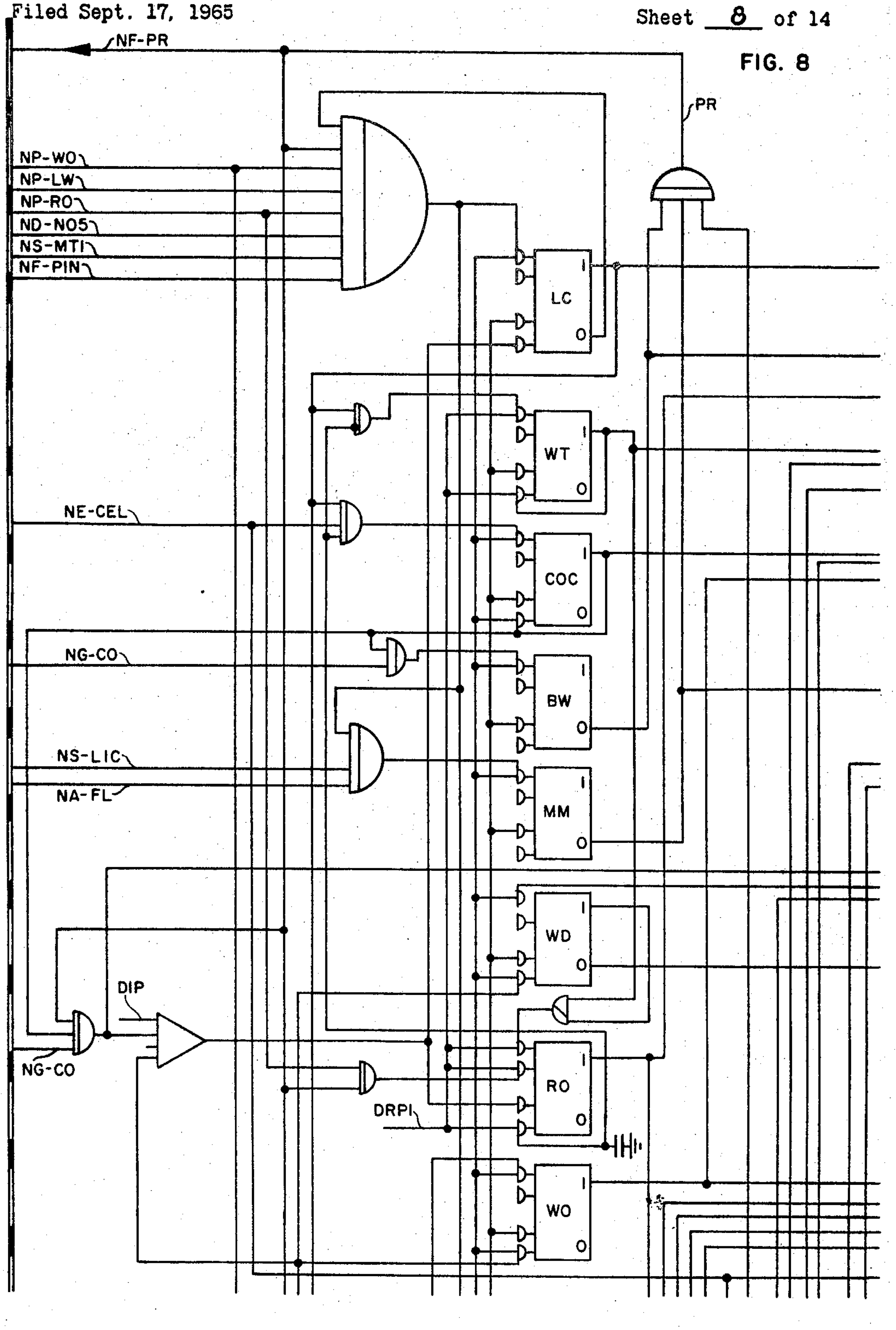
FIGURES 8, 9 and 12 shows the details of the control circuit.
Figure 9:
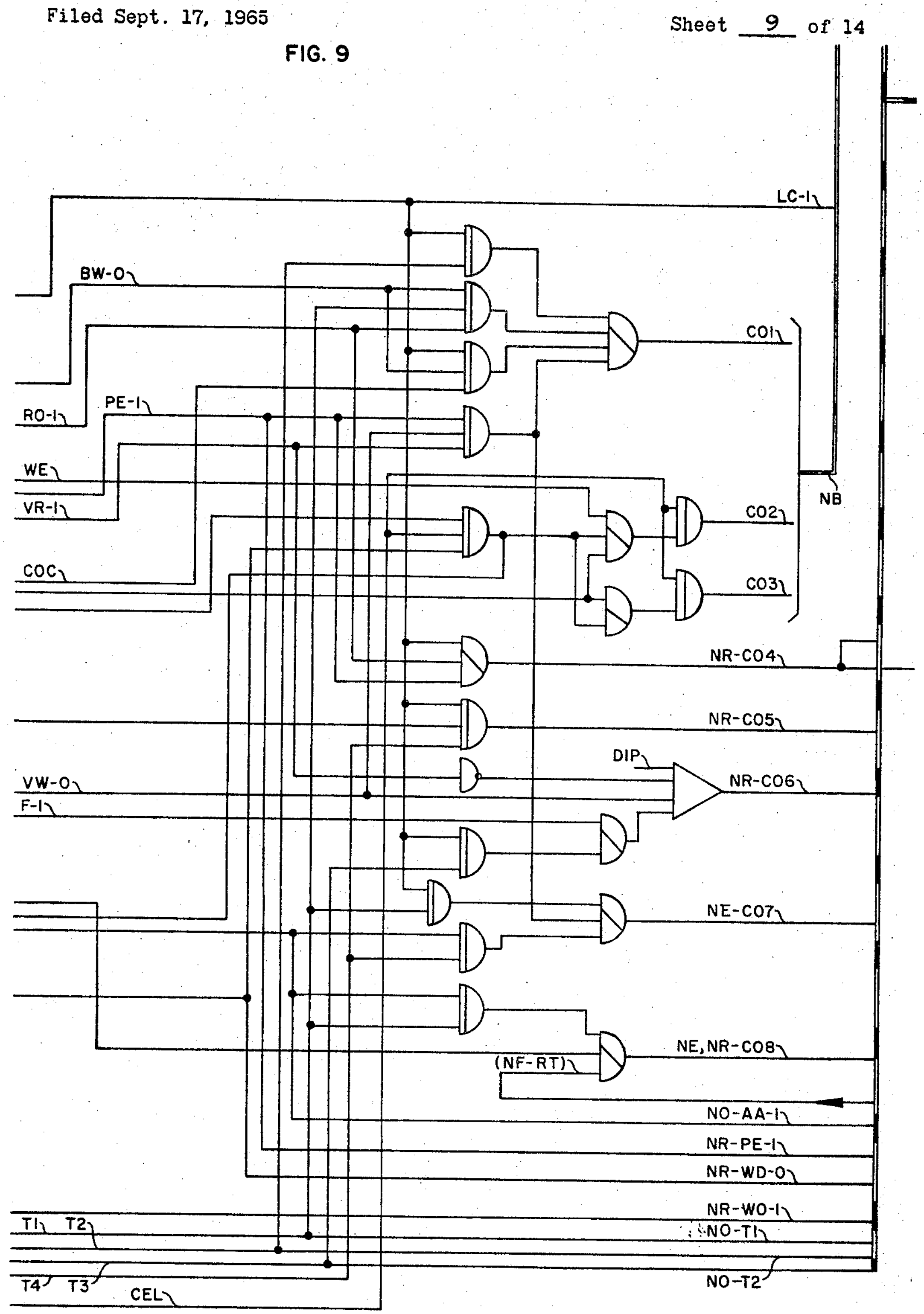

This output and the output of the console register which has the address of line count being processed are also at all times being compared at the console coincidence circuit. Upon coincidence of the two addresses the signal CEL is given. This signal with a set WT flip-flop (FIG. 8) in the control circuit creates the command CO2 to cause a writing operation upon the drum.

Command CO2 is sent upon coincidence of the drum address count with the address stored in the console register and sets write flip-flop WT, as well as enabling the drum write amplifiers to write in the advanced count as stored in the NR flip-flops S1–S16.

With the LC and RO flip-flops set at the time that address coincidence is received flip-flop COC is set. This sends command CO1 to the drum readout circuit to read-out the count. The meter count is read from the drum surface at heads (W1–4, W12–15, W23, 25, 26, 34, 36, 46, 48 and 60) amplified in amplifiers R1–R16 and switched at PB1–16. The output of switches PB1–16 is transferred into the NG buffer register flip-flops B1–B16 and the coincidence gates PC1–PC4 for a correct write verification. Upon coincidence of this count with that stored in the NR buffer register the signal CO is generated. Signal CO with a set COC flip-flop will generate command CO10 to reset flip-flop LC to indicate a successfully completed metering operation. The absence of a CO signal indicating non-coincidence of the written count with that stored in the NR record buffer, with flip-flop COC still set will be effective to set flip-flop BW to indicate a bad write in.

Should a second flag signal FL appear before the metering operation for a preceding one was completed, flip-flop MM will be operated.

*Flip-flop*

CP1=NS-DIP (NP-$\overline{\text{SZ}}$ + NF-RT)

| | Set | Reset |
|---|---|---|
| AA | NS-DIP CEL $\overline{\text{AA}}$ $\overline{\text{LC}}$ RO | NS-DIP AA T4 + CP1 |
| BW | NS-DIP $\overline{\text{CO}}$ COC | CP1 |
| MM | NS-DIP NS-$\overline{\text{LIC}}$ NA-FL (set LC) | CP1 |
| CR | NS-DIP $\overline{\text{VR}}$ $\overline{\text{VW}}$ | CP1 |
| COC | NS-DIP CEL RO LC | NS-DIP COC + CP1 |
| F | NS-DIP NP-$\overline{\text{WO}}$ PR | NS-DIP + CP1 |
| LC | NS-DIP NS-MT1 $\overline{\text{LC}}$ PR NP-WO NP-LW NP-RO ND-NO 5 NF-PIN | CP1 + CO10 |
| PE | NS-DIP PR $\overline{\text{LC}}$ ND-NO4 NP-PE NF-PIN | CP1 + DRP CR |
| RO | DRP (WT + WD) + DRP NP-RO PR | DRP RO + CO10 |
| T1 | NS-DIP (set LC) + (set AA) | NS-DIP T1 + CP1 |

Flip-Flop—Continued

| | Set | Reset |
|---|---|---|
| T2 | NS-DIP T1 | NS-DIP T2 + CP1 |
| T3 | NS-DIP T2 | NS-DIP T3 + CP1 |
| T4 | NS-DIP T3 | NS-DIP T4 + CP1 |
| VR | NR-PBS17 $\overline{VR}$ + DIP (NP-SZ + NF-RT) | NR-PBR17 PE VR |
| VW | NS-DIP $\overline{VR}$ | CP1 |
| WD | NS-DIP WO CEL $\overline{WD}$ | NS-DIP AA T4 + CP1 |
| WO | NS-DIP F | NS-DIP AA T4 + CP1 |
| WT | DRP LC $\overline{RO}$ | DRP WT + CP1 |
| WZ | DRP $\overline{VR}$ PE | DRP WZ + CP1 |

*Signals*

CO1=LC T2 + T1 RO $\overline{BW}$ + LC COC $\overline{BW}$ + PE $\overline{VW}$ VR
CO2=CEL (WZ + WO $\overline{WD}$ + WT)
CO3=CEL (WZ + WO $\overline{WD}$)
CO4=LC + RO + PE
CO5=LC T4 $\overline{MM}$
CO6=DIP ($\overline{VW}$ $\overline{VR}$ + F + T3 LC)
CO7=LC T1 + PE VR $\overline{VW}$ + AA T4
CO8=NF-RT + COC CO PR + AA T1
PR=$\overline{BW}$ $\overline{MM}$ $\overline{CR}$
PN=(PE + MM) NF PS1
CO10=DIP (COC CO PR + AA T4)

*Buffer register (NG)*

Figure 10:
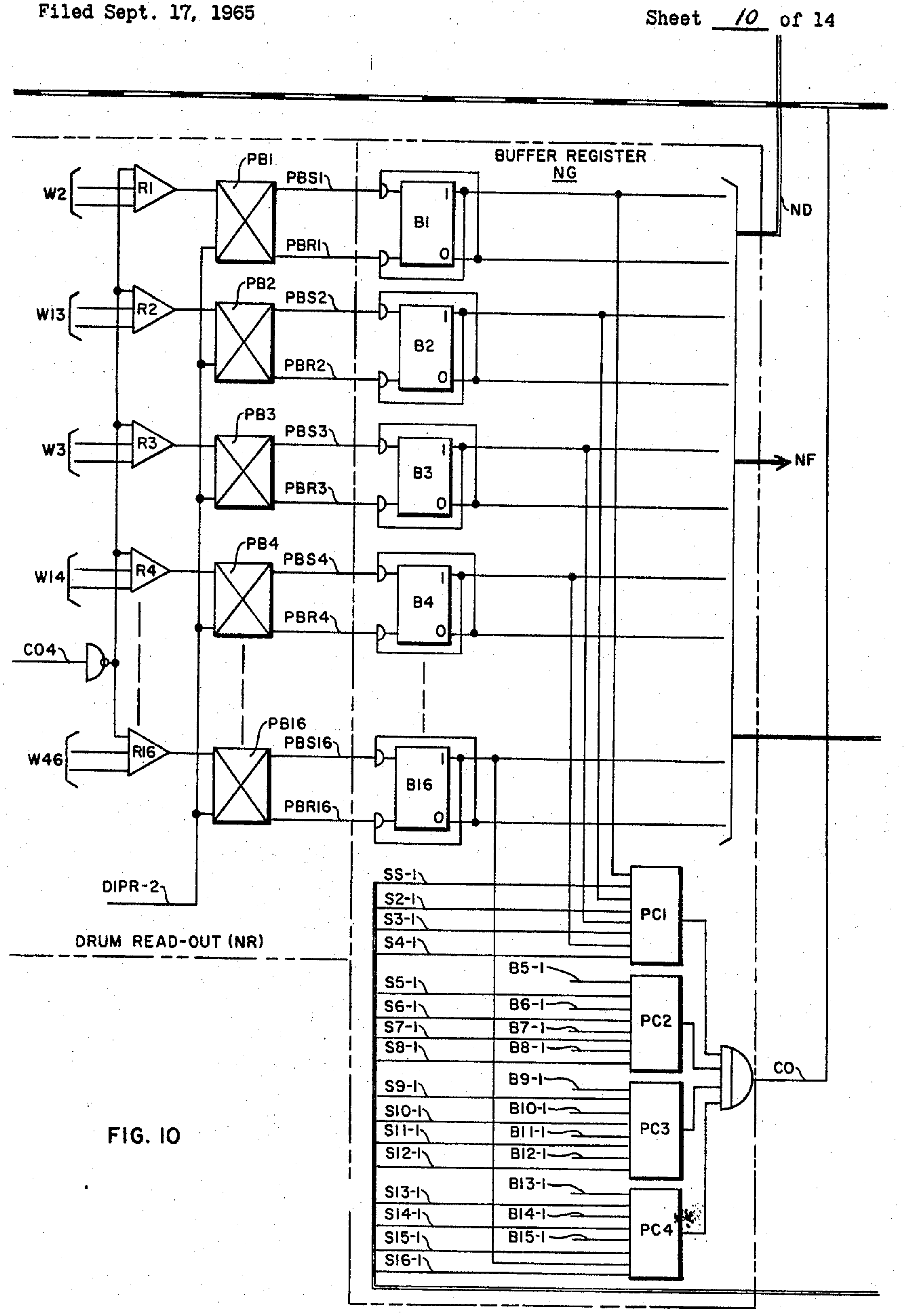
FIGURE 10 shows the drum read out portion of the drum record circuit, the buffer register circuit with its associated coincidence circuit.

The buffer register is shown in FIGURE 10. It consists of a 16 flip-flop register B1–B16 and a group of coincidence gates PC1–PC4.

The information from the drum read amplifiers consisting of the meter count is registered in the flip-flops continuously as the drum is scanned. This information is available to the perforator access circuit, to the counter access circuit for passage to the console register and to the coincidence gate inputs.

This data from the flip-flops B1–B16 is compared with the output of the drum record flip-flops S1–S16 during the verification operation.

The conditions for setting and resetting each of the flip-flops and for providing the outputs is presented below in tabular form.

| FF | Set | Reset |
|---|---|---|
| | Units | |
| B1 | NR-PBS1 $\overline{B1}$ | NR-PBR1 B1 |
| B2 | NR-PBS2 $\overline{B2}$ | NR-PBR2 B2 |
| B3 | NR-PBS3 $\overline{B3}$ | NR-PBR3 B3 |
| B4 | NR-PBS4 $\overline{B4}$ | NR-PBR4 B4 |
| | Tens | |
| B5 | NR-PBS5 $\overline{B5}$ | NR-PBR5 B5 |
| B6 | NR-PBS6 $\overline{B6}$ | NR-PBR6 B6 |
| B7 | NR-PBS7 $\overline{B7}$ | NR-PBR7 B7 |
| B8 | NR-BPS8 $\overline{B8}$ | NR-PBR8 B8 |
| | Hundreds | |
| B9 | NR-PBS9 $\overline{B9}$ | NR-PBR9 B9 |
| B10 | NR-PBS10 $\overline{B10}$ | NR-PBR10 B10 |
| B11 | NR-PBS11 $\overline{B11}$ | NR-PBR11 B11 |
| B12 | NR-PBS12 $\overline{B12}$ | NR-PBR12 B12 |
| | Thousands | |
| B13 | NR-PBS13 $\overline{B13}$ | NR-PBR13 B13 |
| B14 | NR-PBS14 $\overline{B14}$ | NR-PBR14 B14 |
| B15 | NR-PBS15 $\overline{B15}$ | NR-PBR15 B15 |
| B16 | NR-PBS16 $\overline{B16}$ | NR-PBR16 B16 |

*Signals*

PC1=(NR-S1 B1 + NR-$\overline{S1}$ $\overline{B1}$) (NR-S2 B2 + NR-$\overline{S2}$ $\overline{B2}$)
(NR-S3 B3 + NR- $\overline{S3}$ $\overline{B3}$) (NR-S4 B4 + NR-$\overline{S4}$ $\overline{B4}$)
PC2=(NR-S5 B5 + NR-$\overline{S5}$ $\overline{B5}$) (NR-S6 B6 + NR-$\overline{S6}$ $\overline{B6}$)
(NR-S7 B7 + NR-$\overline{S7}$ $\overline{B7}$) (NR-S8 B8 + NR-$\overline{S8}$ $\overline{B8}$)
PC3=(NR-S9 B9 + NR-$\overline{S9}$ $\overline{B9}$) (NR-S10 B10 + NR-$\overline{S10}$ $\overline{B10}$)
(NR-S11 B11 + NR-$\overline{S11}$ $\overline{B11}$) (NR-S12 B12 + NR-$\overline{S12}$ $\overline{B12}$)
PC4=(NR-S13 B13 + NR-$\overline{S13}$ $\overline{B13}$) (NR-S14 B14 + NR-$\overline{S14}$ $\overline{B14}$)
(NR-S15 B15 + NR-$\overline{S15}$ $\overline{B15}$) (NR-S16 B16 + NR-$\overline{S16}$ $\overline{B16}$)
CO=PC1 PC2 PC3 PC4

*Console register (NE)*

Figure 7:
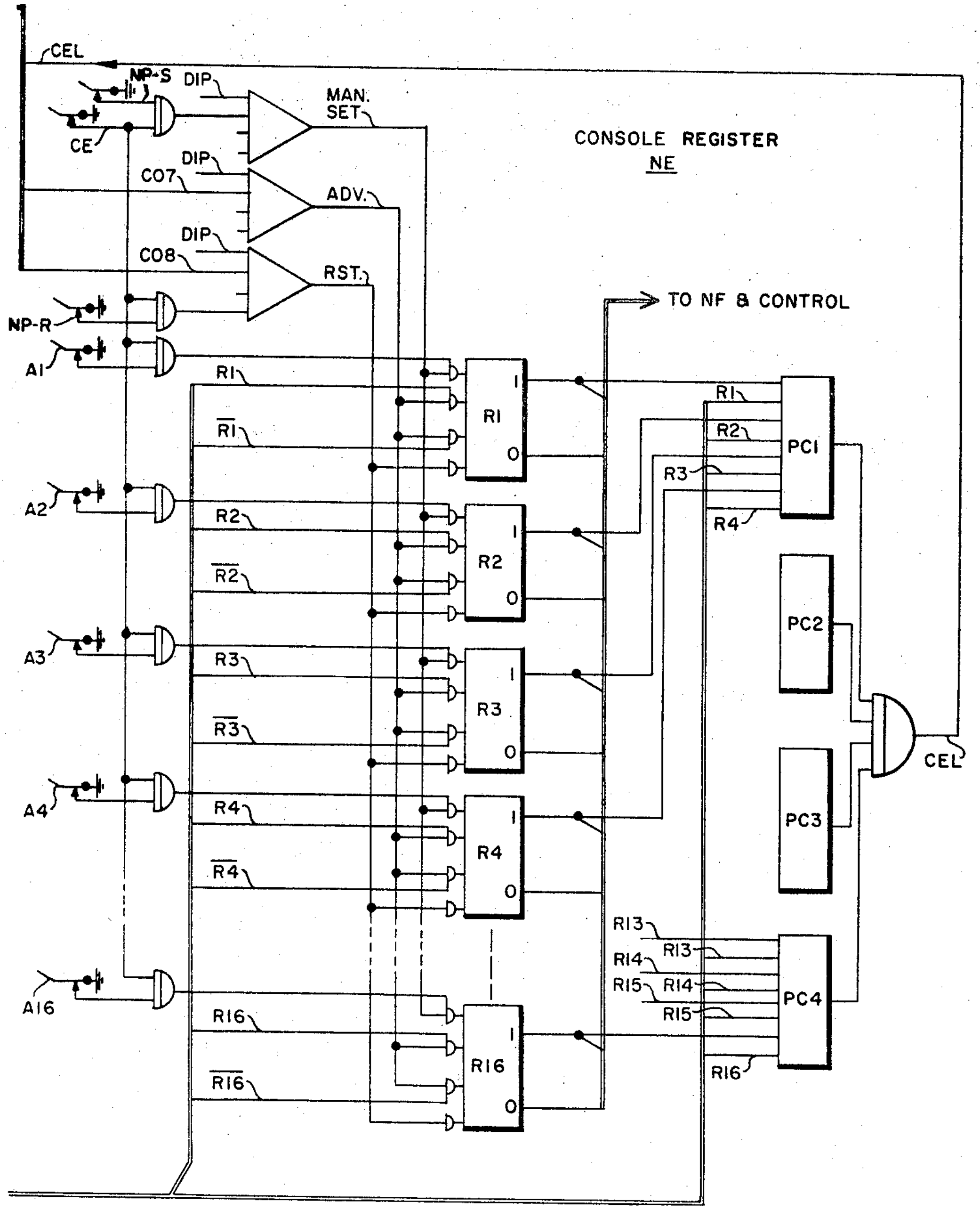
FIGURE 7 shows the console register, control keys and a coincidence circuit.

The local console register is shown in FIGURE 7. It consists of a 16 flip-flop register, a group of coincidence gates, and the pulse drivers. Also shown are keys A1 to A16 for setting the respective flip-flops R1 to R16 and the set and reset keys NP–S and NP–R. These keys are located on the console panel for use by the maintenance and test personnel in setting the register flip-flops manually. The flip-flops are used to store the subscriber number and the meter position on the drum. They are also set automatically upon the command NC–CO7 from the control circuit. The parity circuits PC1 to PC4 are fed the outputs of the register flip-flops and the corresponding counter access circuit output count to provide an output signal upon complete parity. This output signal is used by the control logic to perform a write or read operation for the corresponding position on the drum.

The information and the corresponding register designations are as follows:

R1 to R4=units (from console and counter access register)
R5 to R8=tens (from console and counter access register)
R9 to R12=hundreds (from console and counter access register)
R13 to R16=thousands (from console and counter access register)

The conditions for setting and resetting each of the registers and for providing the outputs is presented below in tabular form.

CP1=DIP NC–CO7=register advance
CP2=DIP NP–S NP–CE=manual set
CP3=DIP NC–CO8+NP–R NP–CE=reset

| FF | Set | Reset |
|---|---|---|
| R1 | CP1 ND-R1 + CP2 NP-A1 | CP1 ND-$\overline{R1}$ + CP3 |
| R2 | CP1 ND-R2 + CP2 NP-A2 | CP1 ND-$\overline{R2}$ + CP3 |
| R3 | CP1 ND-R3 + CP2 NP-A3 | CP1 ND-$\overline{R3}$ + CP3 |
| R4 | CP1 ND-R4 + CP2 NP-A4 | CP1 ND-$\overline{R4}$ + CP3 |
| R5 | CP1 ND-R5 + CP2 NP-A5 | CP1 ND-$\overline{R5}$ + CP3 |
| R6 | CP1 ND-R6 + CP2 NP-A6 | CP1 ND-$\overline{R6}$ + CP3 |
| R7 | CP1 ND-R7 + CP2 NP-A7 | CP1 ND-$\overline{R7}$ + CP3 |
| R8 | CP1 ND-R8 + CP2 NP-A8 | CP1 ND-$\overline{R8}$ + CP3 |
| R9 | CP1 ND-R9 + CP2 NP-A9 | CP1 ND-$\overline{R9}$ + CP3 |
| R10 | CP1 ND-R10 + CP2 NP-A10 | CP1 ND-$\overline{R10}$ + CP3 |
| R11 | CP1 ND-R11 + CP2 NP-A11 | CP1 ND-$\overline{R11}$ + CP3 |
| R12 | CP1 ND-R12 + CP2 NP-A12 | CP1 ND-$\overline{R12}$ + CP3 |
| R13 | CP1 ND-R13 + CP2 NP-A13 | CP1 ND-R13 + CP3 |
| R14 | CP1 ND-R14 + CP2 NP-A14 | CP1 ND-$\overline{R14}$ + CP3 |
| R15 | CP1 ND-R15 + CP2 NP-A15 | CP1 ND-$\overline{R15}$ + CP3 |
| R16 | CP1 ND-R16 + CP2 NP-A16 | CP1 ND-$\overline{R16}$ + CP3 |

*Signals*

$$PC1=(R1\ ND\text{-}R1+\overline{R1}\ ND\text{-}\overline{R1})\ (R2\ ND\text{-}R2+\overline{R2}\ ND\text{-}\overline{R2})$$
$$(R3\ ND\text{-}R3+\overline{R3}\ ND\text{-}\overline{R3})\ (R4\ ND\text{-}R4+\overline{R4}\ ND\text{-}\overline{R4})$$
$$PC2=(R5\ ND\text{-}R5+\overline{R5}\ ND\text{-}\overline{R5})\ (R6\ ND\text{-}R6+\overline{R6}\ ND\text{-}\overline{R6})$$
$$(R7\ ND\text{-}R7+\overline{R7}\ ND\text{-}\overline{R7})\ (R8\ ND\text{-}R8+\overline{R8}\ ND\text{-}\overline{R8})$$
$$PC3=(R9\ ND\text{-}R9+\overline{R9}\ ND\text{-}\overline{R9})\ (R10\ ND\text{-}R10+\overline{R10}\ ND\text{-}\overline{R10})$$
$$(R11\ ND\text{-}R11+\overline{R11}\ ND\text{-}\overline{R11})\ (R12\ ND\text{-}R12+\overline{R12}\ ND\text{-}\overline{R12})$$
$$PC4=(R13\ ND\text{-}R13+\overline{R13}\ ND\text{-}\overline{R13})\ (R14\ ND\text{-}R14+\overline{R14}\ ND\ \overline{R14})$$
$$(R15\ ND\text{-}R15+\overline{R15}\ ND\text{-}\overline{R15})\ (R16\ ND\text{-}R16+\overline{R16}\ ND\text{-}\overline{R16})$$
$$CEL=PC1\ PC2\ PC3\ PC4$$

*Console panel*

Memory words can be recorded on the drum surface from the console, and can be altered at will by a simple keying process. Thus a subscriber counter position can be altered by the console operator with a minimum of effort. Because of the binary nature of magnetic drum storage each digit must be represented in binary form and a four bit binary code is used.

The writing operation is initiated at the console.

Two switch banks are provided: switch band 1 is set to the subscriber number whose counter position is to be altered, and this address loaded into the console register (with access keys A1 to A16, FIG. 7). A lamp display on the console panel indicates whether the subscriber number has been correctly loaded into the console register.

Switch bank 2 is set to the counter position which is to be written on the drum (with the keys C1 to C17). This information is fed to the drum record and read circuit.

At the console, digits are keyed into the console register in parallel fashion, as well as the digits that are keyed into the drum record and read circuit.

The access keys A1 to A16 are grouped in sets of four with each set representing a digit.

The panel also contains push button controls for setting and resetting the console register, for generating the different clock pulses in the pulse distribution circuit, read and write commands and command signals to the four possible work operations LC, WO, RO, PE.

The state LC is commanded by LR and LW. With LR the information on track LIC and MT is read out, with LW the information is allowed to be writen on the drum.

The information present in the console register can be displayed on the console panel indicator lamp for checking purposes. The lamp display also indicates when an alarm is present, and in which of the four states the system is working.

*Perforator access circuit*

The perforator access circuit consists of an information access, a shift register, a binary code converter and the access circuit to the perforator or the printer.

*Translator binary code 2/5, 14 position shift register*

With each position of the shift register the information of four flip-flops (1 digit) of the storage circuit is accessed to form the signals to the binary code converter.

The binary information is translated into a 2/5 code which form the signals to the perforator and printer.

What is claimed is:

1. In an automatic telephone system central office serving a plurality of subscribers lines, with each line terminated at said central office in line circuit and said central office including equipment to supply periodic metering pulses for local and interoffice calls: each said line equipment including a metering relay operated in response to a metering pulse to operate a set of contacts, means to scan each said line for the presence of an operated metering relay, means to identify a line having an operated metering relay, a first and a second individual store for each said line, means operated in response to the presence of an operated metering relay to write a "one" in a first metering store associated with said line, other means operated in response to reading a "one" for a particular one of said lines to operate a first storage means to register the identity of said line and a second storage means to register the cumulative metering count as read from said second store for said line, advance means operated after said registration to advance the cumulative count registered by one unit, and record means thereafter operated to record said cumulative count thus advanced in the second store, and means thereafter operated to erase the "one" from said first store for the said line.

2. A telephone system as claimed in claim 1 including: a cylindrical drum having a surface of magnetic material and including means for rotating said drum about its axis, wherein said individual stores together constitute a single continuous circumferential track on said drum, divided into sections individual to said line metering relays.

3. A telephone system as claimed in claim 2 wherein said second storage means constitutes a plurality of circumferential tracks on the surface of said drum, the number of said tracks corresponds to the number of bits of the cumulative count to be registered, and the store corresponding to a single individual store comprises the bits in each of said tracks along the generatrix of said cylinder.

4. In an automatc telephone system central office serving a plurality of subscribers lines, with each line terminated at said central office in a line circuit and said central office including equipment to supply periodic metering pulses for local and interoffice calls: each said line including a metering relay operated in response to a metering pulse to operate a set of contacts, means to scan each said line for the presence of an operated metering relay, means to identify a line having an operated metering relay, a cylindrical drum having a surface of magnetic material and including means for rotating said drum about its axis, a first and a second individual store for each said line, said first individual stores for each of said line constituting at least one continuous circumferential track on said drum divided into sections individual to said line, and said second individual store comprising a plurality of sections along the generatrix of said cylinder in a plurality of tracks, means operated in response to the presence of an operated metering relay to write a "one" in a first metering store associated with said line, other means operated in response to reading a "one" for a particular one of said lines to operate a first storage means to register the identity of said line and a second storage means to register the cumulative metering count as read from said second store for said line, advance means operated after said registration to advance by one unit the cumulative count registered, and record means thereafter operated to record said count thus advanced in said second store, and means thereafter operated to erase the "one" from said first store for the said line.

5. A telephone system as claimed in claim 4, wherein said cylinder includes a first timing track arranged to produce a single output for each revolution and a second timing track arranged to produce an output for each said line metering section, and further including a counter resettable by said first timing track output and arranged to count in decimal code the output of said second timing track, said counter having an output corresponding to the designations of each said line number having a metering section on said drum.

6. A telephone system as claimed in claim 5, wherein said means to scan each said line comprises a circuit including said metering relay contacts and a series of electronic gates periodically operated by said counter during the interval corresponding to the gates and metering relays decimal designation.

7. In an automatic telephone system central office serving a plurality of subscribers lines, with each line terminated at said central office in circuit and said central office including equipment to supply periodic metering pulses for local and interoffice calls; a cylindrical drum having a surface of magnetic material and including means for rotating said drum about its axis, said cylinder including a first reset track and a second timing track, a counter resettable by said reset track and arranged to count in decimal code the output of said timing track, said counter having an output corresponding to the designations of each said line number having a metering position on said drum, each said line including a metering relay operated in response to a metering pulse to operate a set of contacts, means to scan each said line for the presence of an operated metering relay comprising a series circuit through said metering relay contacts and a series of electronic gating means periodically operated to the conductive state by said counter during the interval of the counter when its count corresponds to the gates and relays designation, means to identify a line having an operated metering relay, a first and a second individual store for each said line, said first individual stores for each of said line constituting at least one continuous circumferential track on said drum divided into sections individual to said line, and said second individual store comprising a plurality of sections along the generatrix of said cylinder in a plurality of tracks, means operated in response to the presence of an operated metering relay to write a "one" in a first metering store associated with said line, other means operated in response to reading a "one" for a particular one of said lines to operate a first storage means to register the identity of said line and a second storage means to register the cumulative metering count as read from said second store for said line, advance means operated after said registration to advance by one unit the cumulative count registered, and record means thereafter operated to record said count thus advanced in said second store, and means thereafter operated to erase the "one" from said first store for the said line.

8. In an automatic telephone system central office serving a plurality of subscribers lines, with each line terminated at said central office in a line circuit and said central office including equipment to supply periodic metering pulses for local and interoffice calls: each said line including a metering relay operated in response to a metering pulse to operate a set of contacts, means to scan each said line for the presence of an operated metering relay, means to identify a line having an operated metering relay, a first and a second individual store for each said line, means operated in response to the presence of an operated metering relay to write a "one" in a first and a second part of said first metering store associated with said line, first erase means operated to remove said written "one" in said first part of said first metering store upon said metering relay restoring, other means operated in response to reading a "one" for a particular one of said lines in said second part of said first store to operate a first storage means to register the identity of said line and a second storage means to register the cumulative metering count as read from said second store for said line, advance means operated after said registration to advance the registered cumulative count by one unit, and record means thereafter operated to record said count thus advanced in said second store, and second erase means thereafter operated to remove the "one" from said second part of said first store for said line.

9. In an automatic telephone system central office serving a plurality of subscribers lines, with each line terminated at said central office in a line circuit and said central office including equipment to supply periodic metering pulses for local and interoffice calls: a cylindrical drum having a surface of magnetic material and including means for rotating said drum about its axis, said cylinder including a first reset track and a second timing track, a counter resettable by said reset track and arranged to count in decimal code the output of said timing track, said counter having an output corresponding to the designations of each said line number having a metering position on said drum, each said line including a metering relay operated in response to a metering pulse to operate a set of contacts, means to scan each said line for the presence of an operated metering relay comprising a series circuit through said metering relay contacts and a series of electronic gating means periodically operated to the conductive state by said counter during the interval of the counter when its count corresponds to the gates and relays designation, means to identify a line having an operated metering relay, a first and a second individual store for each said line, said first individual stores for each of said line constituting at least two continuous circumferential tracks on said drum divided into sections individual to said line, and said second individual store comprising a plurality of sections along the generatrix of said cylinder in a plurality of tracks, means operated in response to the presence of an operated metering relay to write a "one" in a said first and second metering store associated with said line, first erase means operated to remove said written "one" in said first metering store upon a succeeding revolution of said drum after said metering relay is released, other means operated in response to reading a "one" for a particular one of said lines in said second metering store to operate a first storage means to register the identity of said line and a second storage means to register the cumulative metering count as read from said second store for said line, advance means operated after said registration to advance by one unit the cumulative count registered, and record means thereafter operated to record said count thus advanced in said second store, and second erase means thereafter operated to erase the "one" from said second metering track of said first store for said line.

References Cited

UNITED STATES PATENTS

| | | | |
|---|---|---|---|
| 2,838,745 | 6/1958 | Wright et al. | 340—172.5 |
| 2,899,500 | 8/1959 | Bray et al. | 179—7 |
| 2,913,527 | 11/1959 | Wright et al. | 179—7 |

KATHLEEN H. CLAFFY, *Primary Examiner.*

JAN S. BLACK, *Assistant Examiner.*